(12) United States Patent
Bernardi et al.

(10) Patent No.: US 12,083,610 B2
(45) Date of Patent: Sep. 10, 2024

(54) TOOL ACCESSORY MOUNTING INTERFACE

(71) Applicant: Robert Bosch GmbH, Stuttgart (DE)

(72) Inventors: Walter Bernardi, Highland Park, IL (US); Daniel Schadegg, Buffalo Grove, IL (US)

(73) Assignees: Robert Bosch Tool Corporation, Mount Prospect, IL (US); Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/986,209

(22) Filed: Nov. 14, 2022

(65) Prior Publication Data

US 2024/0157453 A1   May 16, 2024

(51) Int. Cl.

| | | |
|---|---|---|
| *B23D 51/10* | (2006.01) | |
| *B23D 61/00* | (2006.01) | |
| *B25F 1/02* | (2006.01) | |
| *B25F 3/00* | (2006.01) | |
| *B25F 5/00* | (2006.01) | |
| *B25F 5/02* | (2006.01) | |
| *B27B 19/00* | (2006.01) | |

(52) U.S. Cl.
CPC ......... *B23D 51/10* (2013.01); *B23D 61/006* (2013.01)

(58) Field of Classification Search
CPC .... B23D 51/10; B23D 61/006; B23D 61/123; B23B 31/18; B23B 31/10; B26B 7/00; B24B 45/006; B24B 23/022; B24B 23/04; B27B 5/30; B25F 3/00; B25F 5/02; B25F 5/006; B26F 1/02

USPC .......... 30/392; 83/699.21; 297/141
See application file for complete search history.

(56) References Cited

U.S. PATENT DOCUMENTS

| | | |
|---|---|---|
| 2,614,441 A | 4/1947 | Goddard |
| 4,386,609 A | 6/1983 | Mongeon |
| 5,489,285 A | 2/1996 | Goris |
| 5,496,316 A | 3/1996 | Goris |
| 5,554,165 A | 9/1996 | Raitt et al. |
| 5,676,688 A | 10/1997 | Jaker et al. |
| D612,874 S | 3/2010 | Nilsson et al. |
| D633,928 S | 3/2011 | Nilsson et al. |
| 7,997,586 B2 | 8/2011 | Ziegler et al. |
| 9,067,293 B2 | 6/2015 | Bernardi et al. |

(Continued)

FOREIGN PATENT DOCUMENTS

| | | |
|---|---|---|
| CN | 201900711 | 7/2011 |
| CN | 102294684 | 12/2011 |

(Continued)

*Primary Examiner* — Ghassem Alie
(74) *Attorney, Agent, or Firm* — Kelly McGlashen

(57) ABSTRACT

An accessory for a power tool includes a mounting interface for detachably mounting the accessory to a clamping device of the power tool. The mounting interface is configured to permit the accessory to be used with a wide variety of clamping devices, regardless of manufacturer. The accessory includes a mounting portion having a spindle slot configured to accommodate a drive spindle of the tool and pin openings that are arranged around the spindle slot. The pin openings are configured to receive pins which are arranged around a spindle of an oscillating power tool. When viewed in a cross section that is perpendicular to the first clamping face, at least a portion of opposed surfaces of at least one pin opening are non-parallel.

18 Claims, 14 Drawing Sheets

(56) References Cited

U.S. PATENT DOCUMENTS

| | | |
|---|---|---|
| 9,120,216 B2 | 9/2015 | Zhang et al. |
| 9,186,770 B2 * | 11/2015 | Montplaisir .......... B27B 19/006 |
| 9,694,472 B2 | 7/2017 | Luescher et al. |
| 10,427,230 B2 | 10/2019 | Bernardi et al. |
| 10,702,927 B2 | 7/2020 | Kaye, Jr. et al. |
| 10,953,563 B2 * | 3/2021 | Morcos .................. A61B 17/14 |
| 11,097,396 B2 | 8/2021 | Montplaisir et al. |
| 11,235,452 B2 | 2/2022 | Kaye, Jr. et al. |
| 11,344,960 B2 | 5/2022 | Churchill |
| 2004/0138668 A1 * | 7/2004 | Fisher .................... B23D 51/10<br>606/82 |
| 2009/0312762 A1 * | 12/2009 | Boykin ................ B23D 61/006<br>606/171 |
| 2011/0316241 A1 | 12/2011 | Zhang et al. |
| 2013/0082449 A1 * | 4/2013 | Bernardi .............. B24B 23/022<br>279/141 |
| 2013/0193655 A1 * | 8/2013 | Kaye, Jr. .................. B27B 5/32<br>279/141 |
| 2015/0108725 A1 * | 4/2015 | Luescher .............. B24B 45/006<br>279/141 |
| 2016/0257010 A1 * | 9/2016 | Jones .................... B23D 51/10 |
| 2017/0348780 A1 * | 12/2017 | Zhang .................. B23D 61/006 |

FOREIGN PATENT DOCUMENTS

| | | |
|---|---|---|
| DE | 202011050511 | 11/2011 |
| DE | 102012201624 | 8/2013 |
| EP | 1090705 | 4/2001 |
| EP | 1882538 | 1/2008 |
| EP | 3439818 | 12/2020 |
| WO | 2013113523 | 8/2013 |
| WO | 2014159025 | 10/2014 |
| WO | WO 2016/134030 A2 * | 8/2016 ............. B23D 51/10 |

* cited by examiner

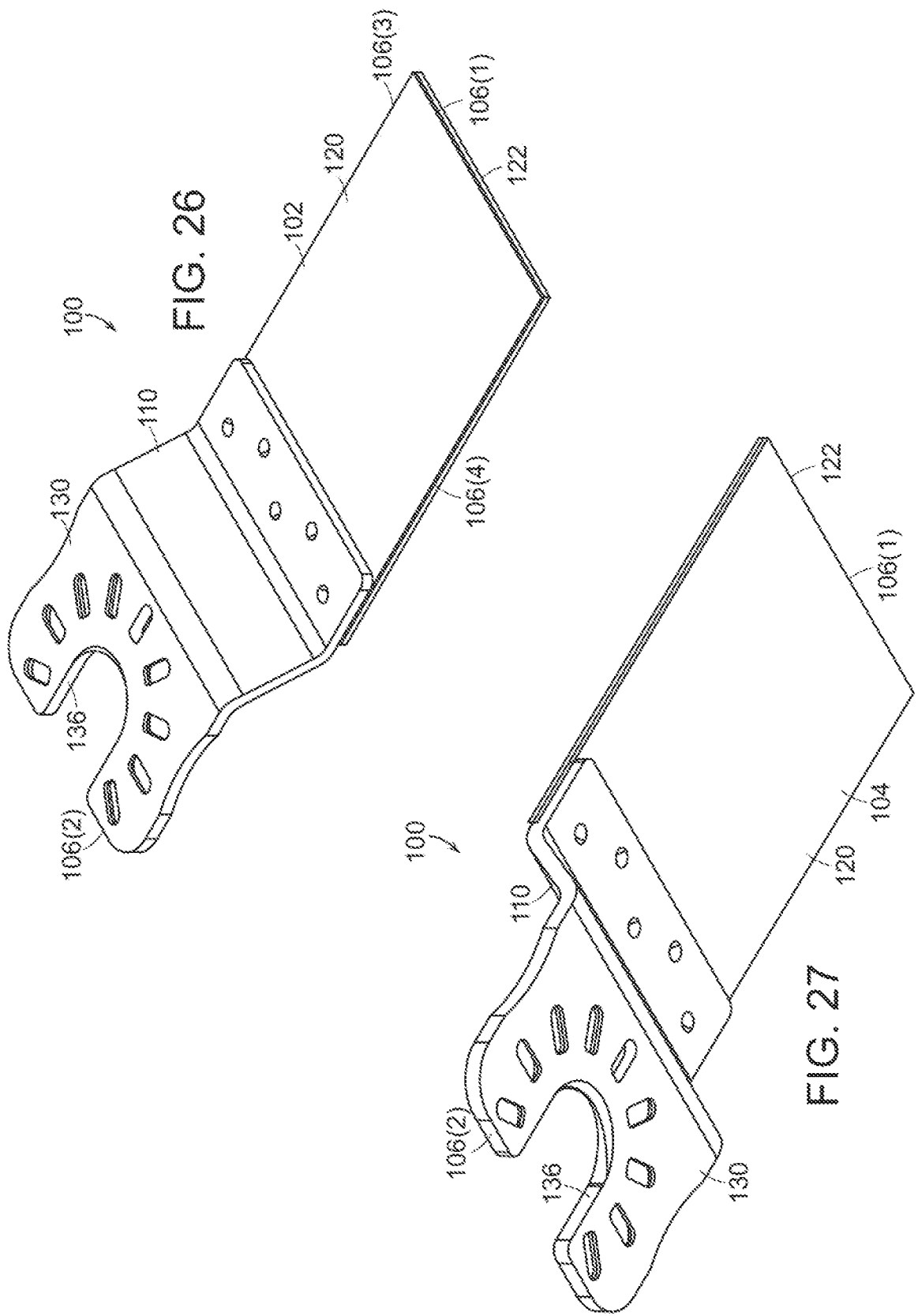

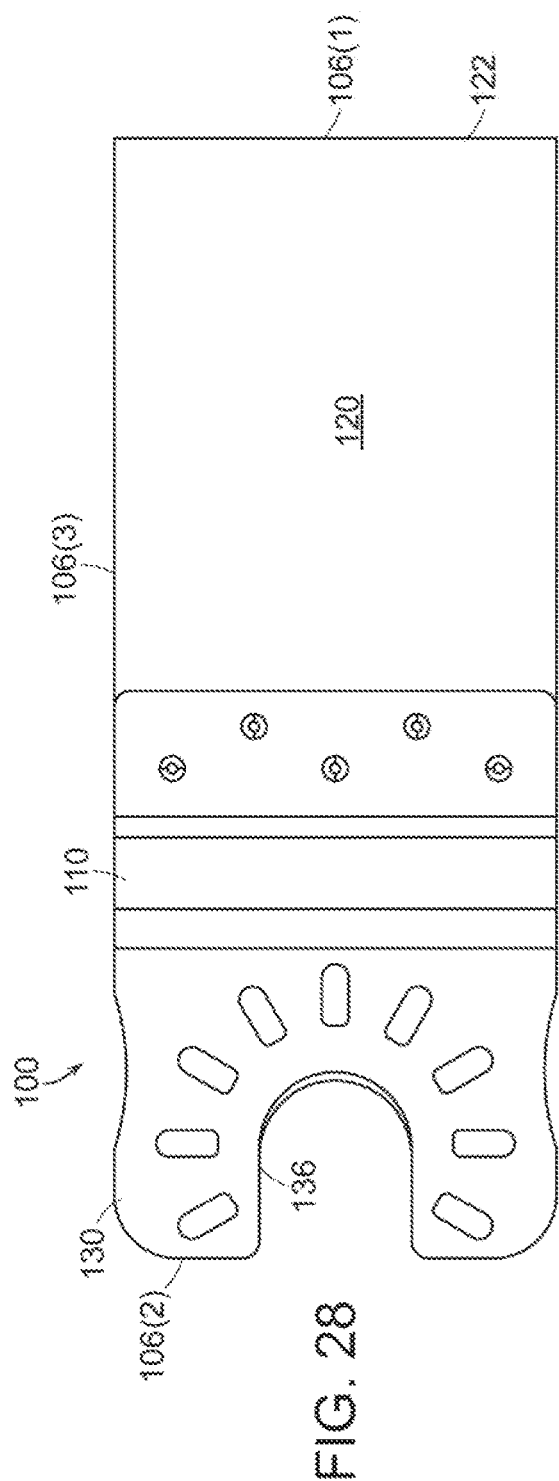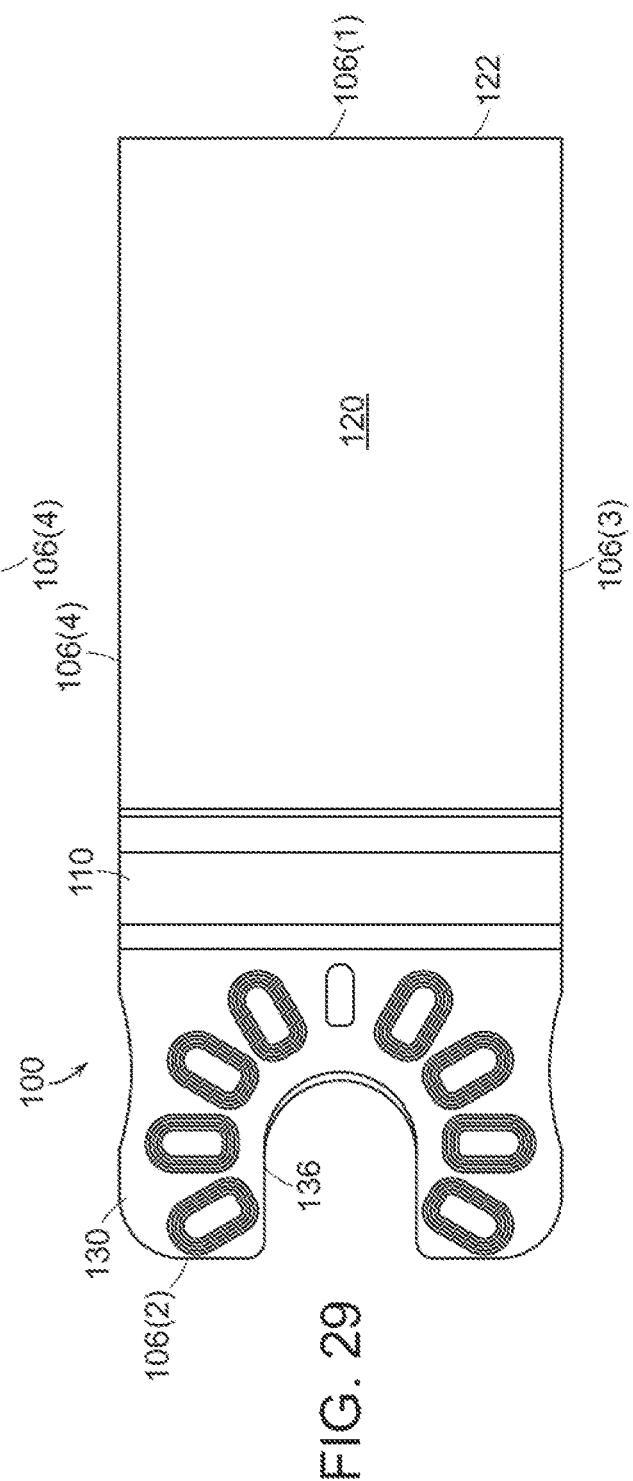

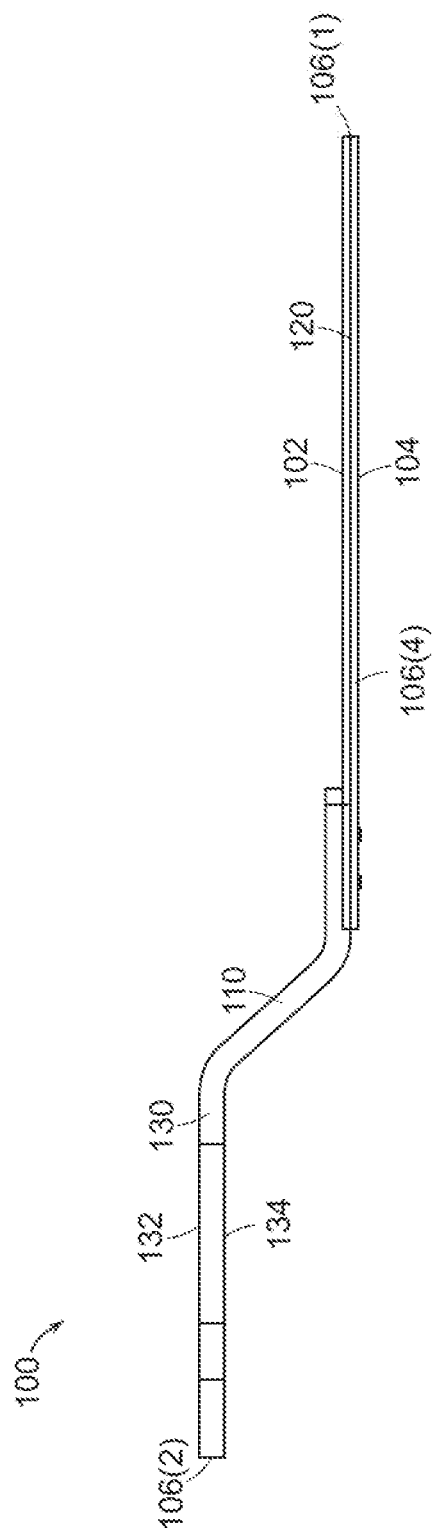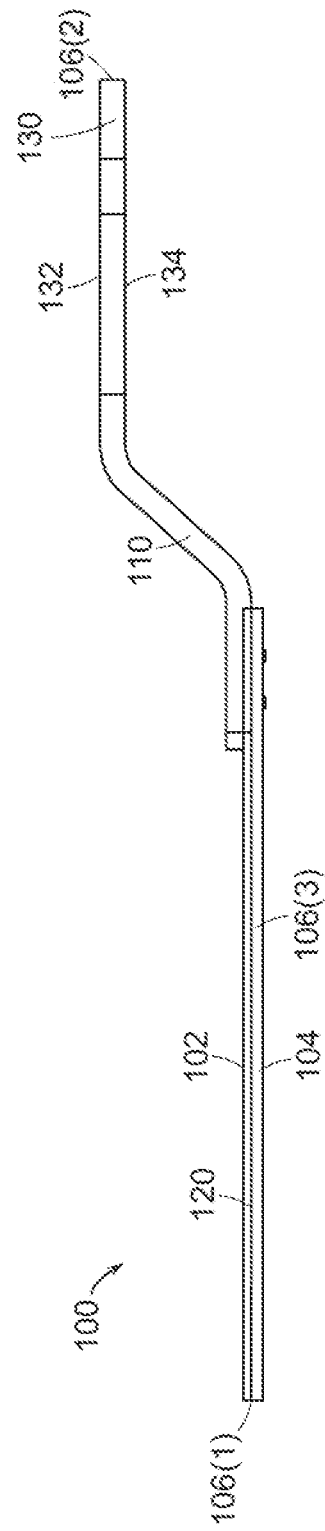

TOOL ACCESSORY MOUNTING INTERFACE

BACKGROUND

Oscillating power tools generally have a motor, an output shaft, and a transmission that connects the motor to the output shaft and converts rotary motion of the motor to oscillating motion of the output shaft. The output shaft is coupled to an accessory attachment mechanism that is used to removably attach various types of accessories, such as cutting tools, saw blades, and sanding tools, to the output shaft. Different brands of oscillating power tools tend to have different, often proprietary, accessory attachment mechanisms. In addition, the number of attachment schemes and types of accessories have increased over time. Thus, it is desirable to have accessories for oscillating power tools, where the accessories have a mounting interface that can be used with as many accessory attachment mechanisms as possible regardless of oscillating tool brand or manufacturer.

SUMMARY

Example embodiments of a tool accessory including the mounting interface relate to blades or other devices used with oscillating power tools. The term "oscillating" is used herein to refer to a back-and-forth motion in any direction whether it be in the same plane as a working edge of the accessory, as is often the case when referring to "oscillating tools" in general parlance, or reciprocating in a plane that is perpendicular to the working edge, as is the case when referring to "reciprocating saws" in general parlance. Therefore, embodiments for either type of motion, as well as others, are included in the scope of the claims presented herein.

The accessory is used to effect a change in a surface of a workpiece, and may perform sanding, scraping, cutting, grinding, scoring and/or other operations on the workpiece. To this end, the accessory includes a working portion and a mounting portion.

The working portion of the accessory includes a working edge that is applied against the workpiece to effect the desired change. In a cutting accessory (e.g., a cutting blade), the working edge defines a series of cutting teeth. In a sanding accessory (e.g., a sanding block), the working edge is an abrasive surface.

The mounting portion of the accessory includes features that permit mounting to a clamping device of a power tool. The mounting features include a spindle slot that receives a spindle of the clamping device, and pin openings that partially surround the spindle slot. The spindle slot and the pin openings are "through openings," e.g., they are openings that extend through the thickness of the mounting portion between a first clamping face and a second clamping face of the mounting portion. The pin openings are shaped and dimensioned to receive pins provided on a clamping flange of the clamping device.

The accessory described herein includes a mounting interface that permits the accessory to be used with a wide variety of clamping devices, and thus may be considered to be a "universal" mounting interface. This is achieved by providing at least one of the pin openings of the mounting portion with a profile that, when viewed in a cross section that is perpendicular to the first clamping face, is non-rectangular since at least a portion of opposed surfaces of the pin opening is non-parallel. By this configuration, the pin opening has an irregular profile such that the pin opening has a first area in a location that is coplanar with the first clamping face and a second area in a location that is coplanar with the second clamping face, and the first area is less than the second area.

In some aspects, an accessory for oscillating power tools includes a working portion configured to perform an operation on a workpiece and a mounting portion configured to be clamped between a clamping flange and a spindle head of a tool holder of an oscillating power tool. The mounting portion includes a first clamping face that is configured to abut the clamping flange and a second clamping face that is spaced apart from the first clamping face and faces away from the first clamping face. The second clamping face is configured to abut the spindle head. The mounting portion includes a spindle slot that extends in an axial direction through the mounting portion from the first clamping face to the second clamping face. The spindle slot is configured to accommodate a spindle of an oscillating power tool. In addition, the mounting portion includes pin openings that extend in the axial direction through the mounting portion from the first clamping face to the second clamping face. The pin openings are arranged around the spindle slot and are configured to receive pins which are arranged around the spindle of an oscillating power tool. When viewed in a cross section that is perpendicular to the first clamping face, at least a portion of opposed surfaces of at least one pin opening are non-parallel.

In some embodiments, the portion of opposed surfaces of at least one pin opening adjoins the second clamping face.

In some embodiments, the portion of opposed surfaces of at least one pin opening is linear and at an acute angle with respect to the first clamping face.

In some embodiments, the portion of opposed surfaces of at least one pin opening is non-linear.

In some embodiments, the portion of opposed surfaces of at least one pin opening is curved.

In some embodiments, the portion of opposed surfaces of at least one pin opening corresponds to a first portion of opposed surfaces of at least one pin opening. When viewed in a cross section that is perpendicular to the first clamping face, a second portion of opposed surfaces of at least one pin opening adjoins the first clamping face, the first portion of opposed surfaces of at least one pin opening is linear and at a first angle with respect to the first clamping face, the second portion of opposed surfaces of at least one pin opening is linear and at a second angle with respect to the first clamping face, and the first angle is different from the second angle.

In some embodiments, the first angle is an acute angle and the second angle is substantially a right angle.

In some embodiments, the portion of opposed surfaces of at least one pin opening corresponds to a first portion of opposed surfaces of at least one pin opening. When viewed in a cross section that is perpendicular to the first clamping face, a second portion of opposed surfaces of at least one pin opening adjoins the first clamping face, the first portion of opposed surfaces of at least one pin opening is curved and defines a concavity with respect to the second clamping face, and the second portion of opposed surfaces of at least one pin opening is linear and at an angle with respect to the first clamping face.

In some embodiments, the portion of opposed surfaces of at least one pin opening corresponds to a first portion of opposed surfaces of at least one pin opening. When viewed in a cross section that is perpendicular to the first clamping face, a second portion of opposed surfaces of at least one pin opening adjoins the first clamping face, the first portion of opposed surfaces of at least one pin opening has a first thickness and the second portion of opposed surfaces of at least one pin opening has a second thickness. The term thickness refers to a dimension in a direction perpendicular to the first clamping face, and the first thickness is greater than the second thickness.

In some embodiments, the portion of opposed surfaces of at least one pin opening extends from the first clamping face to the second clamping face.

In some embodiments, the at least one pin opening is elongated and defines a long axis in a direction corresponding to a direction of elongation. The long axis of the at least one pin opening extends along a radius of a spindle longitudinal axis, where the spindle longitudinal axis extends axially and is centered in the spindle slot.

In some embodiments, the at least one pin opening has a first area in a location that is coplanar with the first clamping face and a second area in a location that is coplanar with the second clamping face, and the first area is less than the second area.

In some aspects, an accessory for oscillating power tools includes a working portion configured to perform an operation on a workpiece; and a mounting portion configured to be clamped between a clamping flange and a spindle head of a tool holder of an oscillating power tool. The mounting portion includes a first clamping face that is configured to abut the clamping flange, and a second clamping face that is spaced apart from the first clamping face and faces away from the first clamping face. The second clamping face is configured to abut the spindle head. The mounting portion includes a spindle slot that extends in an axial direction through the mounting portion from the first clamping face to the second clamping face. The spindle slot is configured to accommodate a spindle of an oscillating power tool. In addition, the mounting portion includes pin openings that extend in the axial direction through the mounting portion from the first clamping face to the second clamping face. The pin openings are arranged around the spindle slot and are configured to receive pins which are arranged around the spindle of an oscillating power tool. At least one pin opening has a first area in a location that is coplanar with the first clamping face and a second area in a location that is coplanar with the second clamping face, and the first area is less than the second area.

In some embodiments, when viewed in a cross section that is perpendicular to the first clamping face, at least a portion of opposed surfaces of at least one pin opening are non-parallel.

In some embodiments, the portion of opposed surfaces of at least one pin opening adjoins the second clamping face, is linear and at an acute angle with respect to the first clamping face.

In some embodiments, the portion of opposed surfaces of at least one pin opening adjoins the second clamping face and is non-linear.

In some embodiments, the portion of opposed surfaces of at least one pin opening corresponds to a first portion of opposed surfaces of at least one pin opening. When viewed in a cross section that is perpendicular to the first clamping face, a second portion of opposed surfaces of at least one pin opening adjoins the first clamping face, the first portion of opposed surfaces of at least one pin opening is linear and at a first angle with respect to the first clamping face, the second portion of opposed surfaces of at least one pin opening is linear and at a second angle with respect to the first clamping face, and the first angle is different from the second angle.

In some embodiments, the first angle is an acute angle and the second angle is substantially a right angle.

BRIEF DESCRIPTION OF THE FIGURES

FIG. 26 is a top perspective view of the accessory of FIG. 3.

FIG. 27 is a bottom perspective view of the accessory of FIG. 3.

FIG. 28 is a top view of the accessory of FIG. 3.

FIG. 29 is a bottom view of the accessory of FIG. 3.

FIG. 30 is a right side view of the accessory of FIG. 3.

FIG. 31 is a left side view of the accessory of FIG. 3.

DETAILED DESCRIPTION

Figure 1:
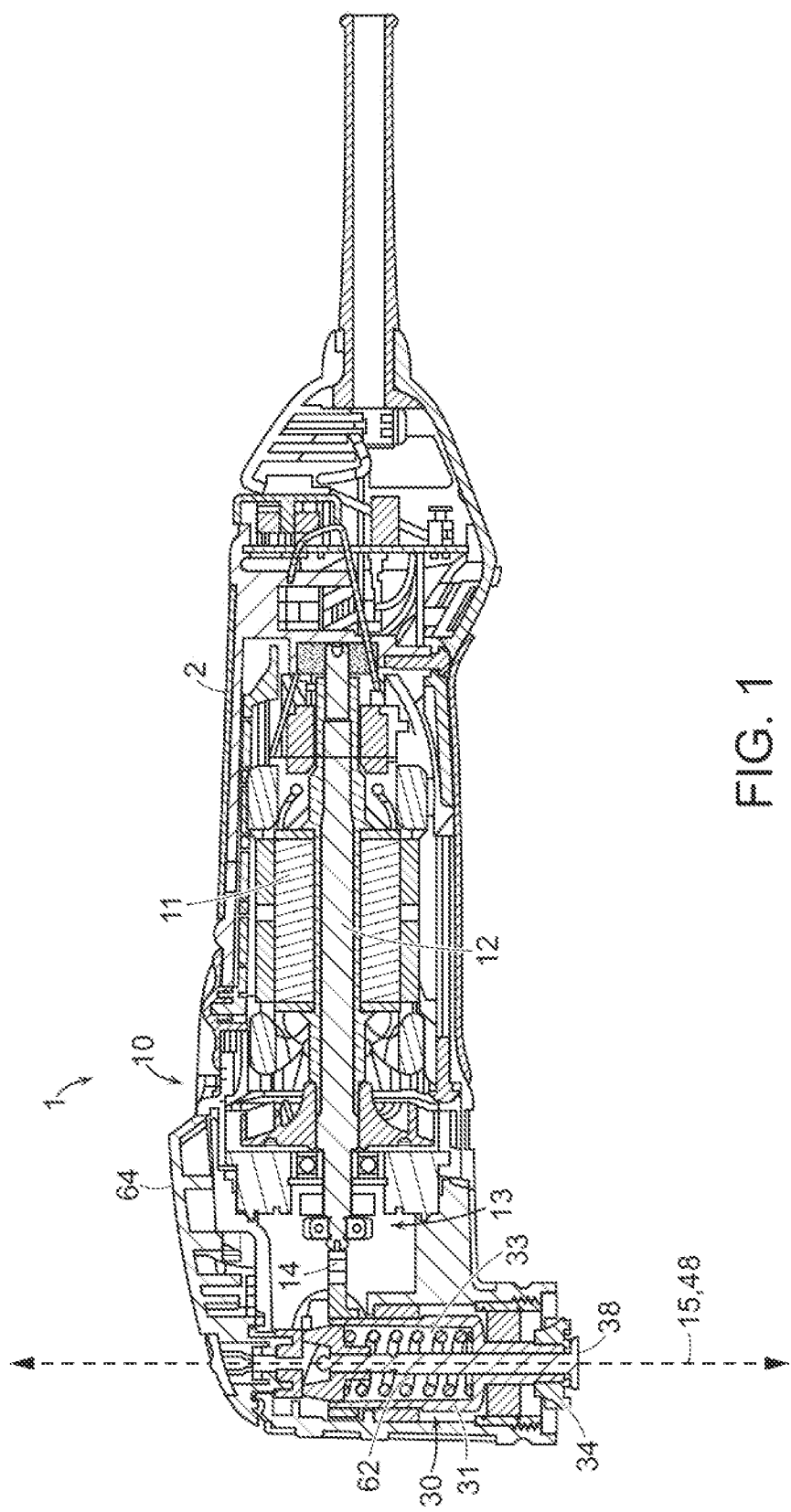
FIG. 1 is a cross sectional view of a power tool showing the clamping device in the clamped position without an accessory connected thereto.
Figure 2:
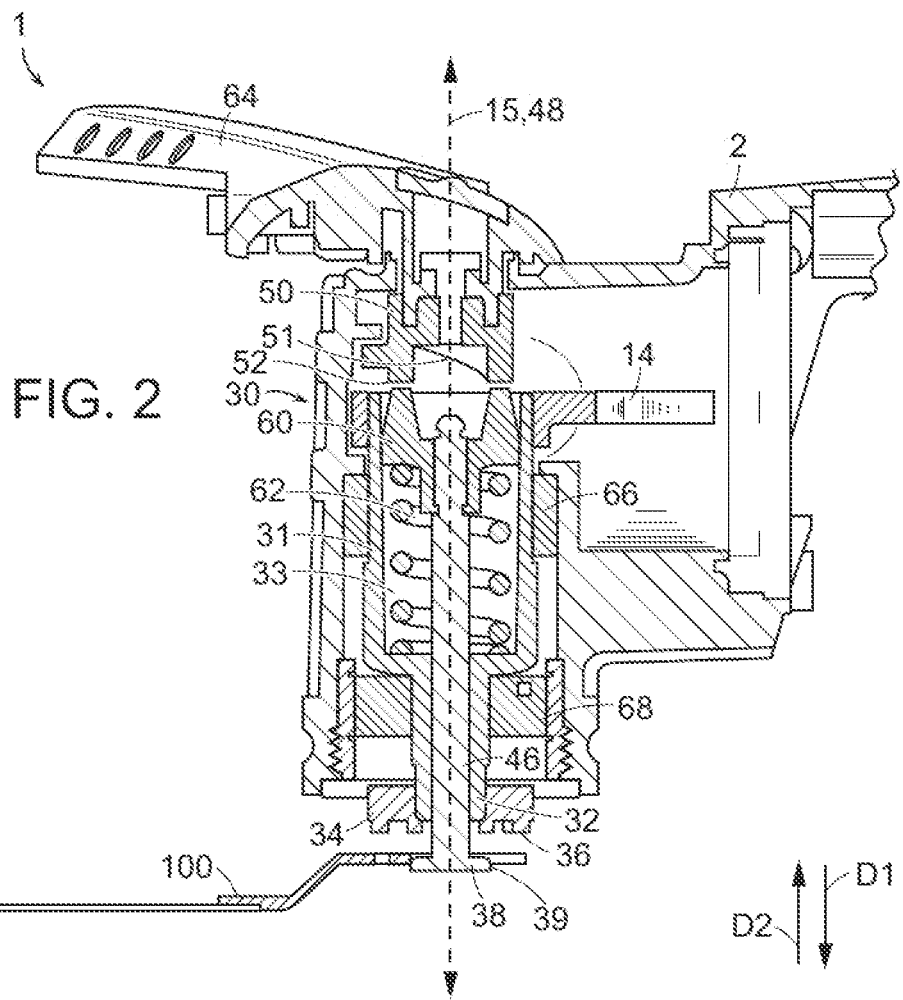
FIG. 2 is a cross sectional view of the front portion of the power tool of FIG. 1, showing the clamping device in the unclamped position and an accessory disposed between the spindle head and the clamping flange of the clamping device.
Figure 3:
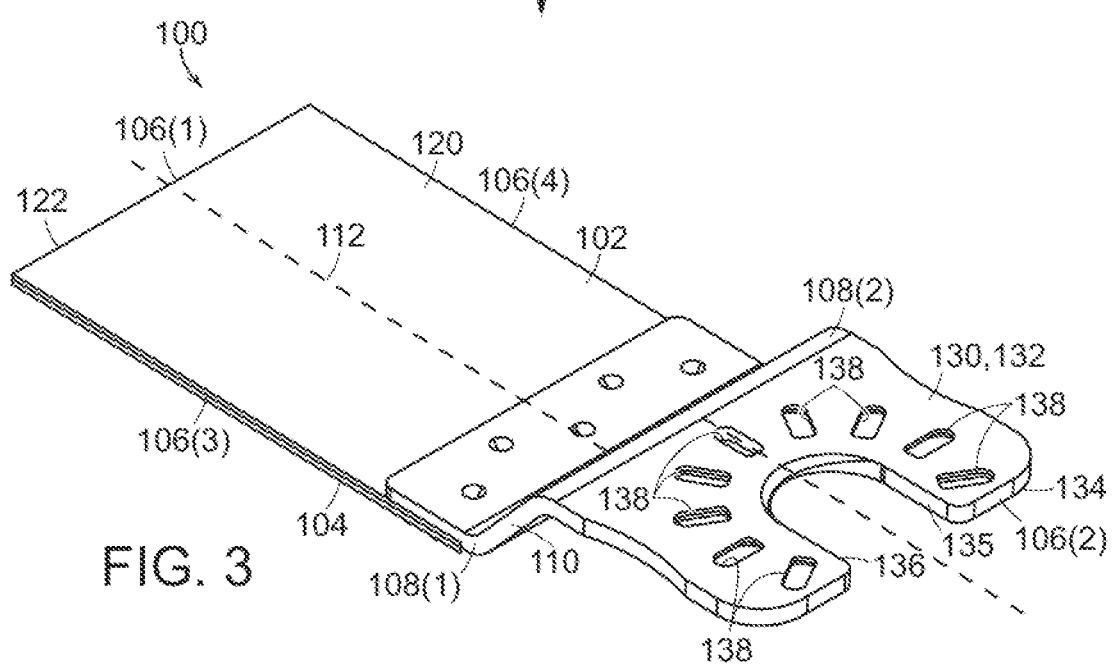
FIG. 3 is a top, front perspective view of the accessory.
Figure 4:
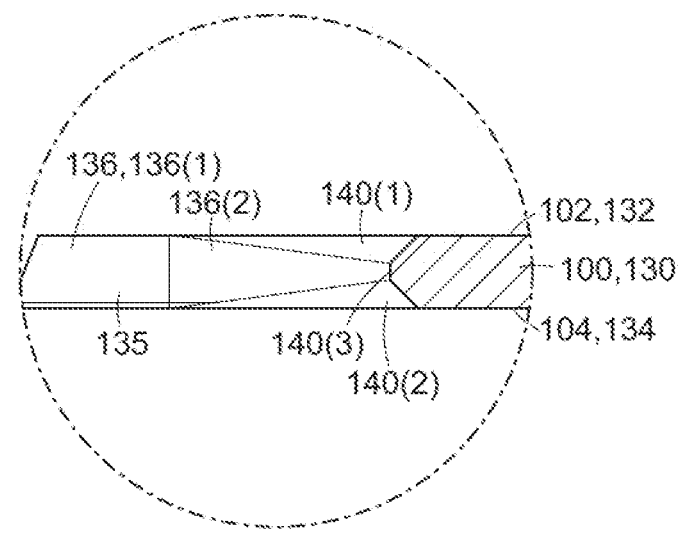
FIG. 4 is cross-sectional view of a portion of the accessory, the portion encircled by a broken line in FIG. 7.

Referring to FIGS. 1 and 2, an accessory 100 is mounted on (e.g., fixedly connected to) an output shaft of a power tool 1. When used with an oscillating and/or rotating power tool 1, the accessory 100 is driven to oscillate and/or rotate via a motor 11 disposed within a tool housing 2 of the power tool 1. To this end, the power tool 1 includes a drive system 10 and an accessory attachment mechanism that includes a clamping device 30 at least partially positioned within the tool housing 2. The clamping device 30 may be adjusted between a clamped position and an unclamped position. In the clamped position, the clamping device 30 connects the accessory 100 to the power tool 1 in such a way that it may be driven to oscillate by the motor. In the unclamped position the accessory 100 may be assembled with or removed from the power tool 1. The accessory 100 includes a mounting portion 130 having a mounting interface that permits the accessory to be used with a wide variety of clamping devices, e.g., provides a "universal" mounting interface. The mounting portion 130 includes a spindle slot 136 and pin openings 138 that provide the mounting interface and are configured to accommodate multiple different clamping devices. The accessory 100 including the mounting portion 130 will be described in detail below.

The drive system 10 includes an electric motor 11 and a transmission 13. The electric motor 11 includes a motor shaft 12 and is provided as any electric motor known to those of ordinary skill in the art. The transmission 13 is coupled to the motor shaft 12 and includes a drive lever 14. The transmission 13 converts rotation of the motor shaft 12 into oscillatory movement of the drive lever 14 about an axis of oscillation 15.

The clamping device 30 includes an output shaft 31, a clamping flange 34, a spindle 46 that terminates in a spindle head 38, a follower 60, an actuator provided as a cam 50, a biasing spring 62, and a handle 64.

The output shaft 31 is rotatably supported in the housing 2 by an upper bearing assembly 66 and a lower bearing assembly 68. The output shaft 31 defines a cavity 33 in which the biasing spring 62 and the spindle 46 are at least partially positioned. A lower portion 32 of the output shaft 31 extends from the housing 2. The output shaft 31 is coupled to the drive lever 14. Accordingly, the output shaft 31 oscillates about the axis of oscillation 15, along with the drive lever 14, when the motor 11 is energized. Specifically, the output shaft 31 rotates back and forth through a range of approximately two degrees to three degrees of rotation.

The clamping flange 34 is fixedly connected to the lower portion 32 of the output shaft 31 and is positioned outside of the housing 2. The clamping flange 34 is coupled to the drive system 10 through the output shaft 31. The clamping flange 34 oscillates about the axis of oscillation 15 with the output shaft 31 and in the same manner as the output shaft 31 when the electric motor 11 is energized.

The clamping flange 34 receives the accessory 100 and, in the illustrated embodiment, includes a plurality of protrusions or pins 36. The pins 36 protrude away from the tool housing 2 and toward the spindle head 38. The pins 36 are arranged in a circular pattern centered about the axis of oscillation 15. When the accessory 100 is mounted in the clamping device 30, the pins 36 are received in corresponding pin openings 138 provided in the accessory 100, as discussed in detail below. The pins 36 serve as drive pins that transmit the motion of the clamping device 30 to the accessory 100.

The spindle head 38 is provided on an end of the spindle 46 near the clamping flange 34 and serves as a second clamping flange of the clamping device 30. The spindle head 38 defines a generally circular periphery 39 of greater diameter than the spindle 46.

The spindle 46 extends upward from the spindle head 38 through the cavity 33 in the output shaft 31. The spindle 46 defines a longitudinally extending spindle axis 48 that is coaxial with the axis of oscillation 15. The spindle 46 and the spindle head 38 are moveable in a direction parallel to the axis of oscillation 15 as represented by arrows D1, D2 in FIG. 2; however, the spindle 46 is fixedly connected to the power tool 1 and is not removable from the power tool 1 during the normal course of operation, including when the accessory 100 is removed from the power tool 1.

The follower 60 is fixed to an upper end of the spindle 46 opposite to the spindle head 38 and extends further outward from the spindle 46. The follower 60 is at least partially positioned within the cavity 33 of the output shaft 31. The follower 60 is a unitary component and includes a pair of protrusions that each have a corresponding follower surface that engages and/or interacts with the cam 50. The follower 60 has a generally circular periphery and the protrusions are located on diametrically opposite sides from each other.

The cam 50 of the clamping device 30 is positioned within the housing 2 above the follower 60 and at least partially within the cavity 33 in the output shaft 31. The cam 50 defines a generally circular periphery having a center point 51 that is aligned with the axis of oscillation 15. The cam 50 includes a cam surface 52 positioned to interact with the follower 60.

The cam 50 is rotatably positioned within the housing 2 for rotation about the center point 51 between a clamped position (FIG. 1) and an unclamped position (FIG. 2). When the cam 50 is in the clamped position, the clamping device 30 is in the clamped position. In addition, when the cam 50 is in the unclamped position, the clamping device 30 is in the unclamped position.

The handle 64 of the clamping device 30 is connected to the cam 50 with a fastening member such that rotation of the handle 64 results in rotation of the cam 50. The handle 64 is shown in FIG. 1 with the clamping device 30 in the clamped position, and the handle is shown in FIG. 2, with the clamping device in the unclamped position.

The biasing spring 62 is a compression spring positioned in the cavity 33 of the output shaft 31 between the output shaft 31 and the follower 60. The spring 62 biases the follower 60, the spindle head 38, and the spindle 46 toward the cam 50 for each position of the cam 50. When the clamping flange 34 has received an accessory 100 and the clamping device 30 is in the clamped position, the biasing spring 62 biases the spindle head 38 against the accessory 100, thereby clamping the accessory 100 between the spindle head 38 and the clamping flange 34.

The components of the clamping device 30 are formed from hard and wear resistant materials. Accordingly, the output shaft 31, the clamping flange 34, the spindle head 38, the spindle 46, the follower 60, and the cam 50 may be formed from metal, hard plastics, and/or other like materials as known by those of ordinary skill in the art.

Referring to FIGS. 3-8 and 26-33, the accessory 100 may be, for example, a cutting blade. In this example, the accessory 100 is a thin, rigid plate that has a broad first surface 102, a broad second surface 104 that is opposite the first surface 102, and a narrow peripheral surface (periphery) 106 that extends between the first and second surfaces 102, 104. The accessory 100 is generally rectangular when viewed in top plan view. By this configuration, the periphery 106 includes a first end 106(1), a second end 106(2) and a pair of parallel lateral sides 106(3), 106(4) that extend between the first and second ends 106(1), 106(2). The accessory 100 is elongate so that the lateral sides 106(3), 106(4) are longer than the first and second ends 106(1), 106(2). The accessory also includes a longitudinal midline 112 that is parallel to and midway between the respective lateral sides 106(3), 106(4).

The accessory 100 is non-planar, and includes a pair of closely spaced, parallel bends 108(1), 108(2) that are located closer to second end 106(2) than the first end 106(1). As a result, the accessory 100 includes a planar first portion disposed between the first end 106(1) and the first bend 108(1) referred to as the working portion 120. The accessory 100 includes a planar second portion disposed between the second bend 108(2) and the second end 106(2) referred to as the mounting portion 130. In addition, the accessory 100 includes a third portion 110 that extends between the working portion 120 and the mounting portion 130 and is disposed between the first and second bends 108(1), 108(2). The third portion 110 is angled relative to the working and mounting portions 120, 130 so that the working portion 120 and the mounting portion 130 are parallel and offset with respect to each other in an axial direction. The term "axial direction" refers to an axis that is parallel to the spindle axis 48, keeping in mind that the working and mounting portions 120, 130 are perpendicular to the spindle 46 when the accessory 100 is mounted in the clamping device 30. Thus, the term "axial direction" as used herein also refers to a direction that is perpendicular to the first and second surfaces 102, 104 of the working and mounting portions 120, 130.

The working portion 120 of the accessory 100 includes a working edge 122 that is applied against a workpiece (not shown) to effect a desired change to the workpiece. The desired change may include cutting, shaping, polishing, etcetera. In this example in which the accessory 100 is a cutting accessory (e.g., a cutting blade), the working edge 122 defines a series of cutting teeth (not shown). In a different embodiment, for example when the accessory 100 is a sanding accessory (e.g., a sanding block), the working edge 122 may be an abrasive surface.

Within the mounting portion 130 of the accessory 100, the first surface 102 is referred to as the first clamping face 132 that, in use, faces toward and abuts the clamping flange 34 of the clamping device 30. In addition, within the mounting portion 130 of the accessory 100, the second surface 104 is referred to as the second clamping face 134 that, in use, faces toward and abuts the spindle head 38 of the clamping device 30. Thus, the second clamping face 134 is parallel to, and faces away from, the first clamping face 132 and is spaced apart from the first clamping face 132 a distance corresponding to a thickness of the accessory 100.

The mounting portion 130 includes features that permit mounting to the clamping device 30 of the power tool 1. The mounting features include a spindle slot 136 that receives the spindle 46 of the clamping device 30. In addition, the mounting features include pin openings 138 that partially surround the spindle slot 136. The spindle slot 136 and the pin openings 138 are "through openings," e.g., they are openings that extend through the thickness of the mounting portion 130 between the first clamping face 132 and the second clamping face 134.

Figure 5:
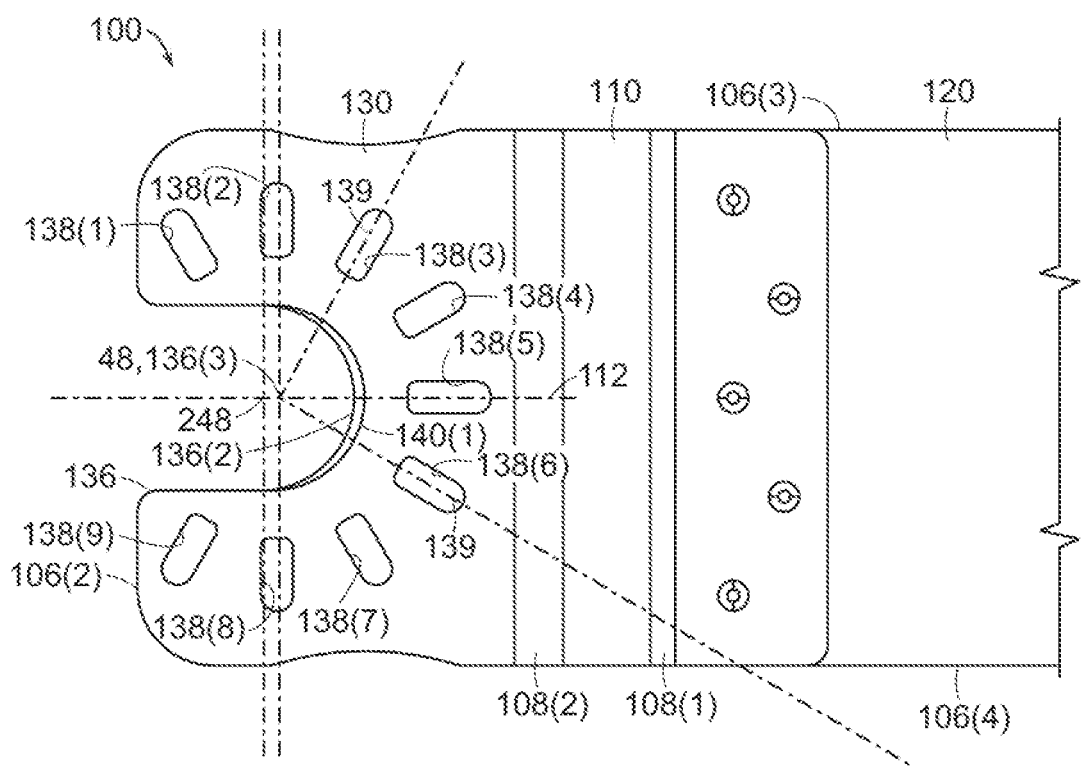
FIG. 5 is a top plan view of a portion of the accessory.
Figure 6:
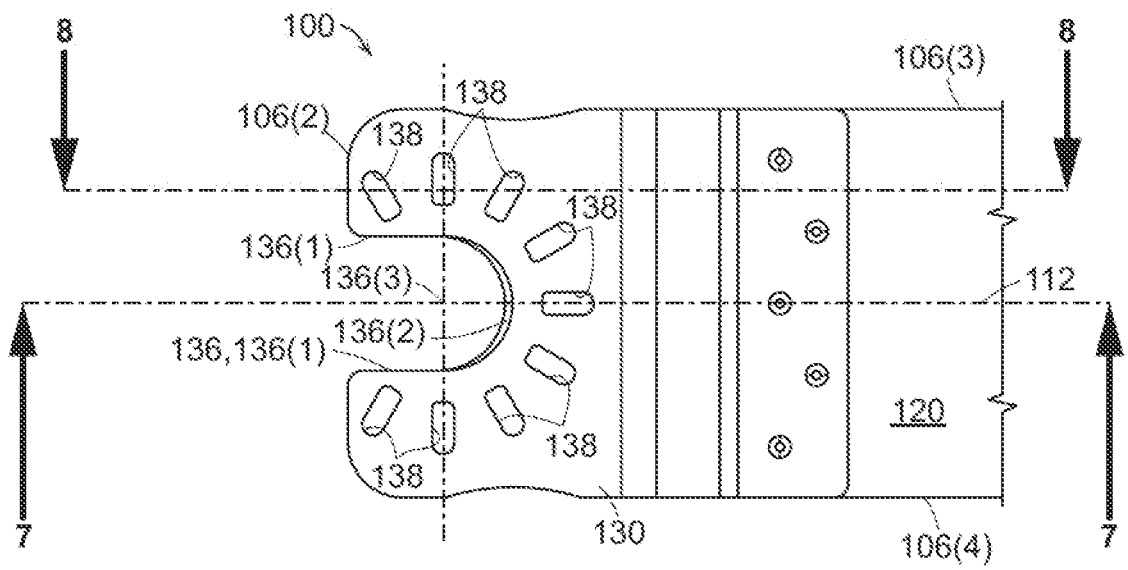
FIG. 6 is a top plan view of a portion of the accessory.
Figure 7:
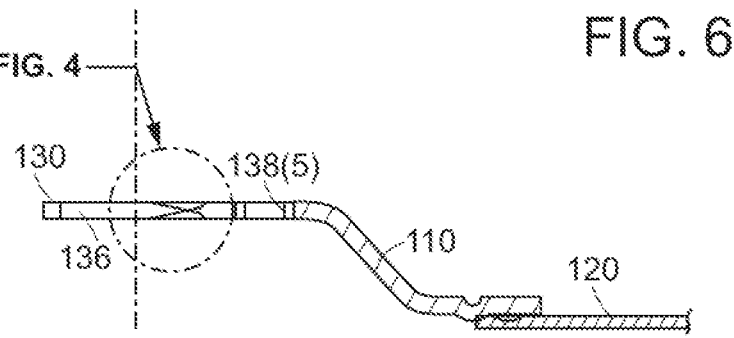
FIG. 7 is a cross-sectional view of the accessory as seen along line 7-7 of FIG. 6.

The spindle slot 136 is a concave cutout that intersects the accessory second end 106(2). When the accessory 100 is viewed in top plan view (FIGS. 5 and 6), the spindle slot 136 is U shaped including linear portions 136(1) that are joined by a curved portion 136(2). The linear portions 136(1) are parallel to the accessory lateral sides 106(3), 106(4), and the curved portion 136(2) is semi-circular and opens facing the accessory second end 106(2). In the illustrated embodiment, the curved portion 136(2) has a diameter that is greater than the maximum diameter of the spindle 46. The curved portion 136(2) is centered on a slot axis 136(3) that is perpendicular to the first and second clamping faces 132, 134. Depending on the manufacturer of the power tool 1, when the accessory 100 is mounted in the clamping device 30, the spindle axis 48 may coincide with the slot axis 136(3) or may be slightly offset toward the second end 106(2) with respect to the slot axis 136(3). In FIG. 5, the spindle axis 48 is illustrated as coinciding with the slot axis 136(3), and the location of an alternative embodiment spindle axis 248 (discussed below with respect to FIGS. 13-15) is illustrated as being offset relative to the slot axis 136(3) along the accessory midline 112.

In the linear portions 136(1), the surface 135 of the spindle slot 136 is perpendicular to the first and second clamping faces 132, 134. However, in the curved portion 136(2), the surface 135 of the spindle slot 136 is beveled with respect to both the first and second clamping faces 132, 134. As a result, when the spindle slot 136 is viewed in a cross section that is perpendicular to the first and second clamping faces 132, 134 and passes through the curved portion 136(2) (FIG. 4), the spindle slot surface 135 is convex and defined by adjacent beveled portions 140(1), 140(2) that intersect at an apex 140(3) that is midway between the first clamping face 132 and the second clamping face 134. The beveled portions 140(1), 140(2) allow the spindle slot 136 to accommodate the spindle 46 while engaging the clamping flange 34 and the spindle head 38 for a wide variety of spindle and clamping flange configurations which are manufacturer dependent.

The pin openings 138 are arranged along an arc that surrounds the spindle slot 136. The pin openings are shaped and dimensioned to receive pins 36 provided on the clamping flange 34 of the clamping device 30. The pin openings 138 are positioned around the spindle slot 136 so as to be in alignment with the pins 36 on the clamping flange 34. The pin openings 138 are sized to receive the pins 36 with very little clearance between the pins 36 and the pin openings 138.

When the accessory 100 is viewed in top plan view, each of the pin openings 138 have a profile that is generally rectangular in shape, with the rectangular shape being elongated and having rounded corners. In addition, each of the pin openings 138 defines a long axis 139 in a direction corresponding to the direction of elongation. The long axis 139 of each pin opening 138 extends along a radius of the slot axis 136(3). In the illustrated embodiment, the accessory 100 includes nine pin openings 138(1), 138(2), 138(3), 138(4), 138(5), 138(6), 138(7), 138(8), 138(9). The long axis 139 of the fifth or central pin opening 138(5) is coincident with the longitudinal midline 112 of the accessory 100. Four pin openings 138(1), 138(2), 138(3), 138(4) are disposed between the central pin opening 138(5) and a first lateral side 106(3) of the accessory 100, and four pin openings 138(6), 138(7), 138(8), 138(9) are disposed between the central pin opening 138(5) and the other lateral side 106(4) of the accessory 100. The pin openings 138(1), 138(2), 138(3), 138(4), 138(6), 138(7), 138(8), 138(9) other than the central pin opening 138(5) are collectively referred to as "lateral pin openings."

As seen when the accessory 100 is viewed in a cross section that is perpendicular to the first and second clamping faces 132, 134 and passes through the central pin opening 138(5) (FIG. 7), the cross-sectional shape of the central pin opening 138(5) is rectangular. That is, opposed surfaces of the central pin opening 138(5) are parallel to each other and perpendicular to the first and second clamping faces 132, 134.

As seen when the accessory 100 is viewed in a cross section that is perpendicular to the first and second clamping faces 132, 134 and passes through at least one lateral pin opening, for example the second pin opening 138(2) (FIG. 8), each of the lateral pin openings 138(1), 138(2), 138(3), 138(4), 138(6), 138(7), 138(8), 138(9) has a profile shape that is non-rectangular. In particular, at least a portion of opposed surfaces 142 of the lateral pin openings 138(1), 138(2), 138(3), 138(4), 138(6), 138(7), 138(8), 138(9) are non-parallel.

The effect of providing the lateral pin openings 138(1), 138(2), 138(3), 138(4), 138(6), 138(7), 138(8), 138(9) with opposed surfaces, or portions thereof, that are non-parallel is to provide a relatively larger opening area A2 at the intersection of the lateral pin opening 138 with the second clamping face 134 than the pin opening area A1 at the intersection of the lateral pin opening 138 with the first clamping face 132. In other words, each lateral pin opening has a first area A1 in a location that is coplanar with the first clamping face 132 and a second area A2 in a location that is coplanar with the second clamping face 134, and the first area A1 is less than the second area A2.

In the illustrated embodiment, with reference to the cross-sectional view of the lateral pin opening 138(2), the surface 142 of the lateral pin opening 138(2) has a first portion 144 that adjoins the second clamping face 134 and a second portion 146 that extends between the first portion 144 and the first clamping face 132. The first portion 144 includes opposed surfaces 144(1), 144(2). Each of the opposed surfaces 144(1), 144(2) of the first portion 144 is linear and is at an acute first angle θ1 with respect to the first clamping face 132. The second portion 146 includes opposed surfaces 146(1), 146(2). Each of the opposed surfaces 146(1), 142(2) of the second portion 146 is linear and is at a right second angle θ2 with respect to the first clamping face 132. Thus, the first and second portion 144, 146 are each at an angle relative to the first clamping face 132, and the first angle θ1 is different from the second angle θ2. In the illustrated embodiment, the first angle θ1 is in a range of 25 degrees to 65 degrees, for example 45 degrees or substantially 45 degrees. In addition, the second angle θ2 is 90 degrees or substantially 90 degrees. As used herein, the term "substantially" refers to the specified angle plus or minus three degrees and is used to allow for manufacturing tolerances and variations.

The first portion 144 of the surface 142 of the lateral pin opening 138(2) has a first thickness t1 and the second portion 146 has a second thickness t2, where the term "thickness" refers to a dimension in a direction perpendicular to the first clamping surface 132. The first thickness t1 is greater than the second thickness t2. The second thickness t2 is made shorter in order to provide a first portion 144 that is relatively big, for example sufficiently big to accommodate the pin configurations of various manufacturers.

Referring to FIGS. 1-2 and 9-12, in use, the accessory 100 is securely attached to the power tool 1 via the clamping device 30 of the power tool 1. Operation of the clamping device 30 to secure the accessory 100 to the power tool 1 will now be described in detail.

In operation, the clamping device 30 securely clamps the accessory 100 to the power tool 1 and is quickly and easily manipulated to release the accessory from the power tool 1. As shown in FIG. 1, the clamping device 30 is in the clamped position without an accessory 100 clamped between the clamping flange 34 and the spindle head 38. To connect an accessory 100 to the power tool 1 the clamping device 30 is first moved to the unclamped position by rotating the handle 64 approximately 140 degrees to 190 degrees, and in one particular embodiment about 150 degrees. No separate tools are needed to move the clamping device 30 to the unclamped position.

Movement of the clamping device 30 from the clamped position to the unclamped position, results in the spindle head 38 being moved in a downward direction D1 away from the clamping flange 34. In particular, rotation of the handle 64 results in rotation of the cam 50 relative to the follower 60. Accordingly, as the cam 50 is rotated toward the unlocked position, the portions of the inclined surfaces 52 in contact with the follower surfaces are positioned increasingly further in the downward direction D1, thereby forcing the follower 60, the spindle 46, and the spindle head 38 to move in the downward direction against the force of the biasing spring 62 to the position shown in FIG. 2. In this way, the profile of the cam surface 52 determines the distance that the spindle head 38 moves as the handle is moved from the clamped position to the unclamped position.

When the handle 64 reaches the unclamped position, the follower protrusions become seated in detents of the cam 50 under the force of the biasing spring 62. The handle 64 is moved easily to the unclamped position since the inclined cam surfaces offer a mechanical advantage when compressing the biasing spring 62, and also since the length of the handle offers a mechanical advantage when rotating the cam 50. Therefore, the clamping device 30 is operable by users of virtually all skill levels including users with reduced manual dexterity.

Figure 9:
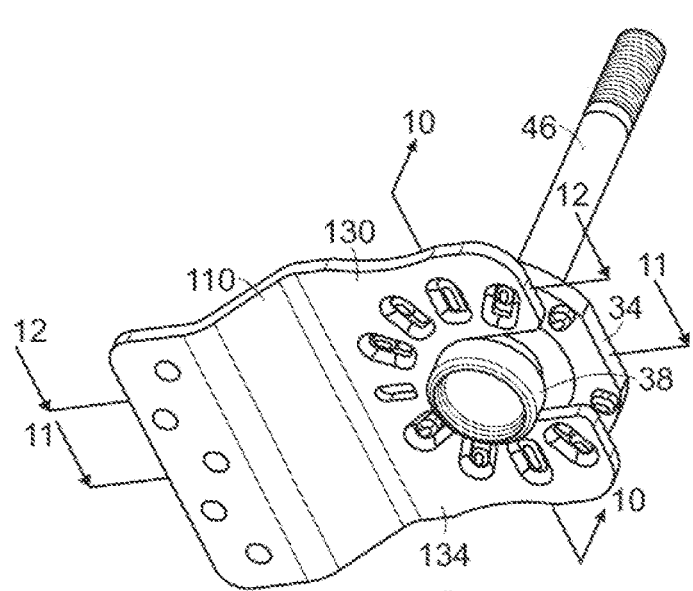
FIG. 9 is a bottom perspective view of a portion of the accessory illustrating the accessory assembled with the clamping device of FIGS. 1 and 2.
Figure 10:
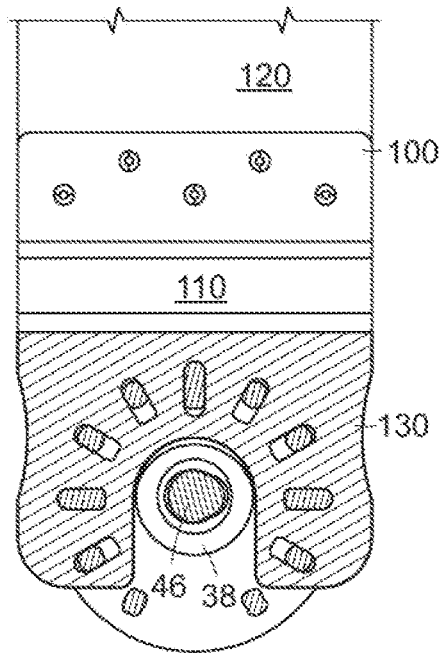
FIG. 10 is a cross-sectional view of the accessory and clamping device as seen along line 10-10 of FIG. 9.

As shown in FIG. 2, when the clamping device 30 is in the unclamped position the spindle head 38 is separated from the clamping flange 34 and the accessory 100 may be received by the outer flange. To connect the accessory 100 to the clamping flange 34, the spindle 46 is moved into the spindle slot 136 (FIGS. 9 and 10). Next, the pin openings 138 are aligned with the pins 36 and the mounting portion 130 is moved in an upward direction D2 until the pins 36 extend into the pin openings 138. The spindle 46 is not removed from the power tool 1 during connection of the accessory 100 to the power tool.

With the accessory 100 received by the clamping flange 34, the handle 64 is moved to the clamped position to clamp the mounting portion 130 of the accessory 100 between the spindle head 38 and the clamping flange 34. The cam 50 is rotated relative to the follower 60 as the handle 64 is moved to the clamped position. As the cam 50 is rotated, the cam protrusions exit the follower detents and the portions of the inclined surfaces 52 in contact with the protrusions are moved increasingly further in the upward direction D2. During this time, the biasing spring 62 maintains the surfaces of the follower 60 against the inclined surfaces 52, such that the follower 60, the spindle 46, and the spindle head 38 move in the upward direction D2 relative to the clamping flange 34 under the force of the biasing spring 62. This movement brings the spindle head 38 into contact with the accessory 100. When the handle 64 is rotated to the clamped position the biasing spring 62 forces the spindle head 38 firmly in the direction of the clamping flange 34 to clamp the mounting portion 130 between the spindle head 38 and the clamping flange 34. Also in the clamped position, an air gap may be formed between the cam 50 and the follower 60, such that the cam surface 52 does not contact the follower surfaces when the clamping device 30 is in the clamped position.

Figure 12:
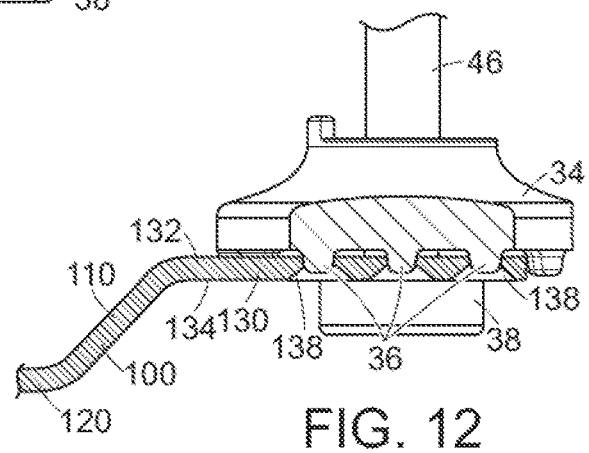
FIG. 12 is a cross-sectional view of the accessory and clamping device as seen along line 12-12 of FIG. 9.

When the clamping device 30 is in the clamped position, the pins 36 of the clamping flange 34 extend through the first area A1 of the pin openings 138 of the accessory mounting portion 130 and are received with a slip fit (FIGS. 10 and 12). The pins 36 received in the lateral pin openings 138(1), 138(2), 138(3), 138(4), 138(6), 138(7), 138(8), 138(9) are disposed in the second portion 146 thereof (FIG. 12). The pins 36 received in the central pin opening 138(5) and a pair of diametrically opposed lateral pin openings 138(2), 138(8) substantially fill the respective openings 138(2), 138(5) 138(8), whereas the remaining pins 36 have a relatively shorter dimension in a direction parallel to the long axis 139 of the corresponding pin openings 138(1), 138(3) 138(4), 138(6), 138(7) 138(9). In this embodiment, the pins 36 are seated at the radially outermost extent of each of the respective pin openings 138 (FIG. 10).

Figure 11:
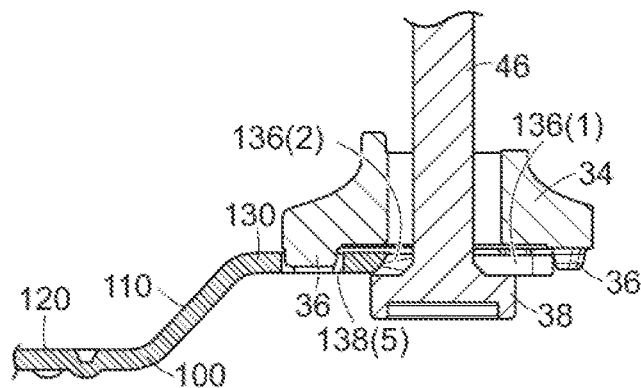
FIG. 11 is a cross-sectional view of the accessory and clamping device as seen along line 11-11 of FIG. 9.

In the illustrated embodiment, the spindle 46 is disposed in the spindle slot 136 with a gap between the spindle 46 and the surface 135 of the spindle slot 136. The periphery 39 of the spindle head 38 underlies the second clamping face 134 of the accessory 100, and the beveled portions 140(1), 140(2) and apex 140(3) of the spindle slot curved portion 136(2) overlie the spindle head 38 (FIG. 11). By this configuration, the spindle head 38 is prevented f-om passing through the spindle slot 136.

After the accessory 100 is clamped to the power tool 1, the electric motor 11 may be energized to cause the accessory 100 to oscillate. The oscillation of the drive lever 14 causes the output shaft 31 to oscillate. The oscillation of the output shaft 31 is transferred to the clamping flange 34 and to the mounting portion 130 of the accessory 100. The working end 268 of the oscillating accessory 100 may be placed in contact with a workpiece to cut or shape the workpiece. In general, the accessory 100 oscillates through a range of approximately two to three degrees.

Figure 13:
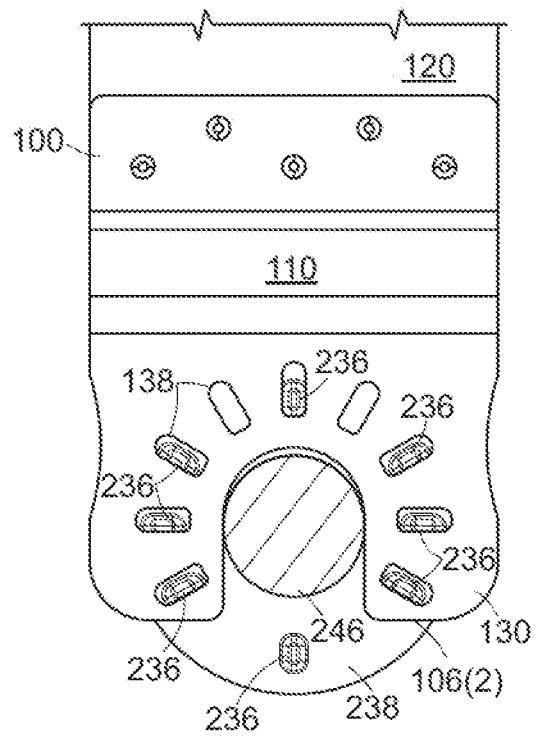
FIG. 13 is a top plan view of a portion of the accessory illustrating the accessory assembled with an alternative embodiment clamping device and with the outer clamping member omitted.
Figure 14:
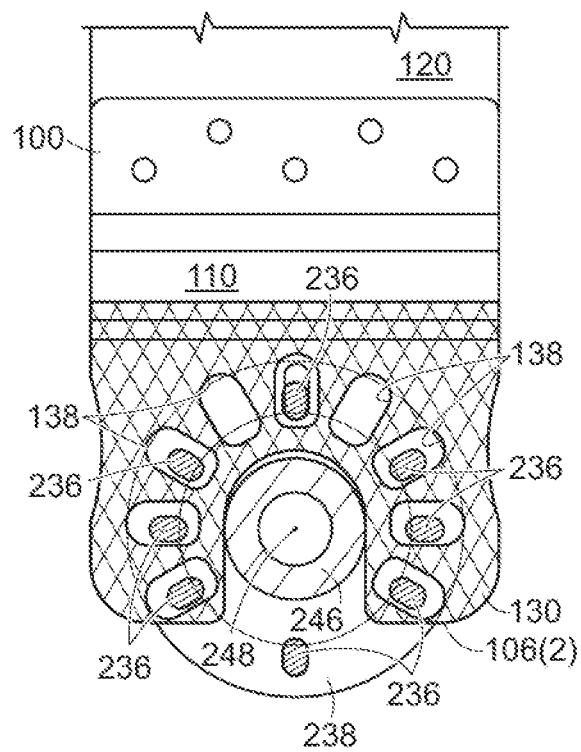
FIG. 14 is a cross-sectional view of the accessory and clamping device of FIG. 13 as seen along line 14-14 of FIG. 15.
Figure 15:
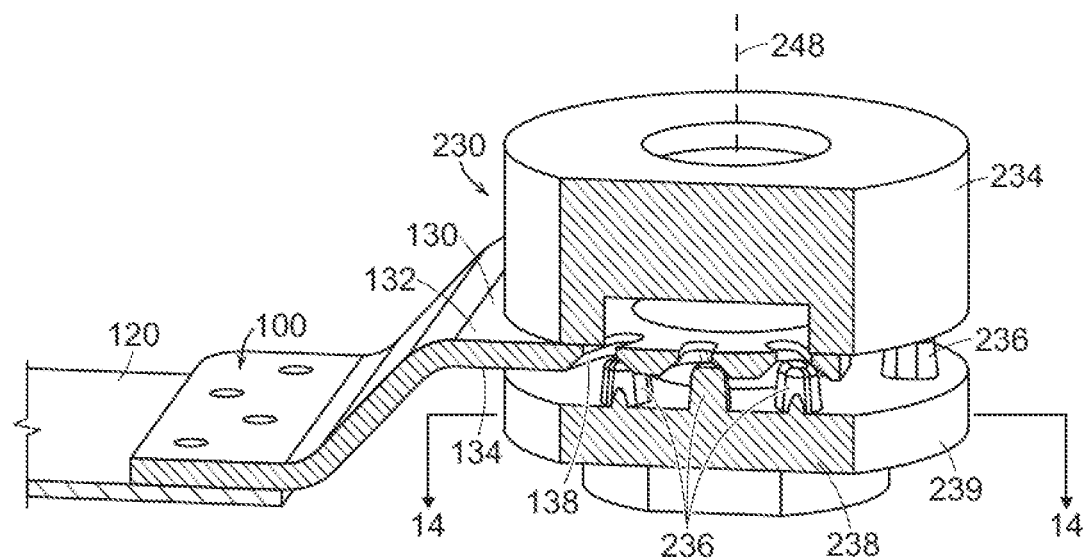
FIG. 15 is a cross-sectional view of the accessory and alternative embodiment clamping device of FIG. 13.

Referring to FIGS. 13-15, the accessory mounting portion 130 includes the spindle slot 136 and pin openings 138 which are configured permit the accessory 100 to be mounted to a variety of accessory attachment mechanisms regardless of manufacturer. In the power tool 1 illustrated in FIGS. 1 and 2, the accessory attachment mechanism is exemplified by the clamping device 30, which includes the clamping flange 34 having the pins 36 that engage the first portion 144 of the corresponding pin openings 138 of the accessory 100. However, the clamping device 30 is not limited to this configuration. For example, some power tools are provided with an alternative embodiment clamping device 230 (FIGS. 13-15) in which the clamping flange 234 is free of pins 36 while the spindle head 238 includes pins 236 that protrude toward the tool housing 2 and toward the clamping flange 234. In addition, the diameter of the spindle 246 that supports the spindle head 238 may be relatively larger than the spindle 46 illustrated above. Thus, the pins 236 are inserted into the accessory 100 via the second clamping face 134 (e.g., via the second area A2) and reside in the first portion 144 of the respective pin opening 138. The positioning of the pins 236 relative to the spindle axis 48 and each other may vary, depending on the manufacturer of the clamping device 230.

To accommodate the pins 236 inserted via the second area A2 and having positions relative to the spindle axis 48 that are different than those of the pins 36 described above, the lateral pin openings 138(1), 138(2), 138(3), 138(4), 138(6), 138(7), 138(8), 138(9) of the accessory 100 have a profile shape that is non-rectangular. In particular, each lateral pin opening 138 has a first area A1 in a location that is coplanar with the first clamping face 132 and a second area A2 in a location that is coplanar with the second clamping face 134. The first area A1 is shaped, dimensioned and positioned to accommodate pins 36 of a clamping device 30 in which the pins 36 protrude from the clamping flange 34. The second area A2 is shaped, dimensioned and positioned to accommodate the pins 236 of a clamping device 230 in which the pins 236 protrude from the spindle head 238. In the illustrated embodiments, the second area A2 is greater than the first area A1 to accommodate the variations in placement, orientation, and size of the pins 236.

For example, in the embodiment illustrated in FIGS. 13-15, when the clamping device 230 is in the clamped position, the pins 236 of the spindle head 238 extend through the second area A2 of the pin openings 138 of the accessory mounting portion 130. The pins 236 received in the lateral pin openings 138(1), 138(2), 138(3), 138(7), 138(8), 138(9) are disposed in the first portion 144 thereof (FIG. 15). In addition, the pins 236 received in the lateral pin openings 138(1), 138(2), 138(3), 138(7), 138(8), 138(9) are offset from the pin opening long axis 139 toward the accessory second end 106(2) such that the respective pins 236 abut one surface 142(1) of the respective opening 138 and are spaced apart from the opposed surface 142(2) (FIGS. 13 and 14). The pin 236 received in the central pin opening 138(5) may have a slip fit or a clearance fit with respect to surfaces of the opening 138(5) parallel to the opening long axis 139 and is seated at the radially innermost extent of the pin openings 138(5).

In the illustrated embodiment, the spindle 246 is disposed in the spindle slot 136 with a clearance fit between the spindle 246 and the surface 135 of the spindle slot 136. The spindle 246 has a slightly larger diameter than the spindle 46 of the earlier embodiment, whereby the spindle axis 248 of the spindle 246 is offset toward the accessory second end 106(2) relative to the spindle axis 48 of the earlier-described spindle 48 (FIG. 5). In addition, the spindle 246 may contact the curved portion 136(2) of the spindle slot 136 at at least one point, for example along the midline 112. The periphery 239 of the spindle head 238 underlies the second clamping face 134 of the accessory 100, and the beveled portions 140(1), 140(2) and apex 140(3) of the spindle slot curved portion 136(2) overlie the spindle head 238. By this configuration, the spindle head 238 is prevented from passing through the spindle slot 136.

Figure 8:
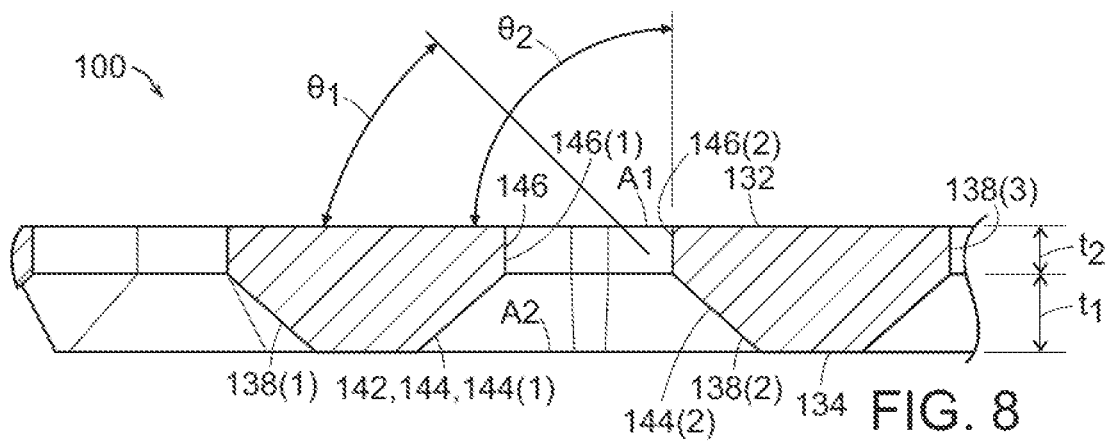
FIG. 8 is an enlarged view of a portion of the cross-section of the accessory as seen along line 8-8 of FIG. 6 illustrating a profile of the lateral pin openings.
Figure 16:
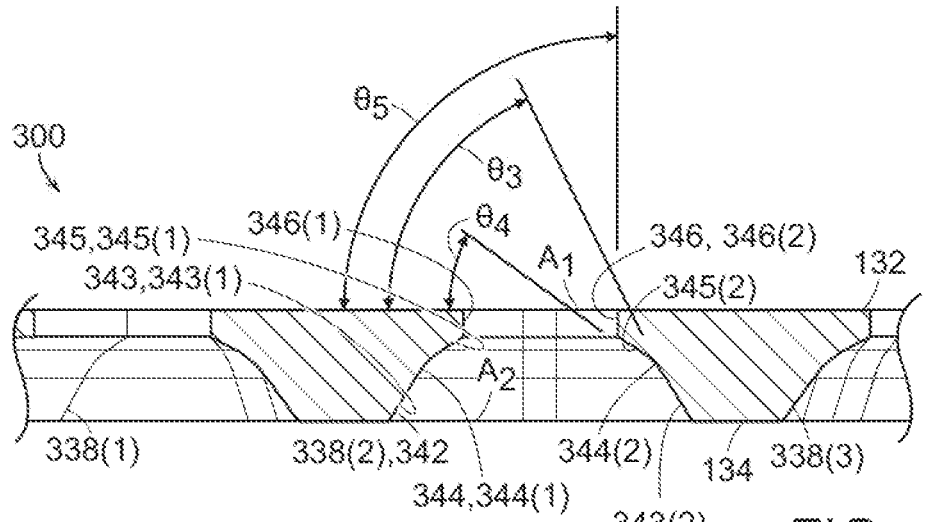
FIGS. 16-21 are enlarged views of a portion of the cross-section of the accessory as seen along line 8-8 of FIG. 6 illustrating alternative embodiment profiles of the lateral pin openings.

Referring to FIGS. 16-21, the accessory 100 is not limited to having lateral pin openings 138 having the cross-sectional profile illustrated in FIG. 8. For example, as seen in FIG. 16, an alternative embodiment accessory 300 may include alternative embodiment lateral pin openings 338. The accessory 300 is similar to the accessory 100 described above, and common reference numbers are used to refer to common elements. As seen when the accessory 300 is viewed in a cross section that is perpendicular to the first and second clamping faces 132, 134 and passes through at least one lateral pin opening, for example the second pin opening 338(2), each of the lateral pin openings 338 has a profile shape that is non-rectangular. In particular, each lateral pin opening 338 has a first area A1 in a location that is coplanar with the first clamping face 132 and a second area A2 in a location that is coplanar with the second clamping face 134, and the first area A1 is less than the second area A2.

In this embodiment, with reference to the cross-sectional view of the lateral pin opening 338(2), the surface 342 of the lateral pin opening 338(2) has a first portion 343 that adjoins the second clamping face 134, a second portion 344 that adjoins the first portion 343, a third portion 345 that adjoins the second portion 344 and a fourth portion 346 that adjoins both the third portion and the first clamping face 132. The first portion 343 includes opposed surfaces 343(1), 343(2). Each of the opposed surfaces 343(1), 343(2) of the first portion 343 is linear and is at a third angle θ3 with respect to the first clamping face 132. The second portion 344 includes opposed surfaces 344(1), 344(2). Each of the opposed surfaces 344(1), 344(2) of the second portion 344 is curved so as to be concave with respect to the second clamping face 134. The third portion 345 includes opposed surfaces 345(1), 345(2). Each of the opposed surfaces 345(1), 345(2) of the third portion 345 is linear and is at an acute fourth angle θ4 with respect to the first clamping face 132. The fourth portion 346 includes opposed surfaces 346(1), 346(2). Each of the opposed surfaces 346(1), 342(2) of the fourth portion 346 is linear and is at a right or substantially right fifth angle θ5 with respect to the first clamping face 132. In the illustrated embodiment, the third angle θ3 is in a range of 50 to 70 degrees, for example 60 degrees, while the fourth angle θ4 is in a range of 20 to 40 degrees, for example 30 degrees. In this embodiment, each portion 343, 344, 345, 346 is non-parallel to the first clamping face 132. The first through third portions 343, 344, 345 are configured (e.g., shaped, dimensioned and positioned to) to define a concavity that receives the pins 236 of the clamping device 230 of FIG. 15, whereas the fourth portion 346 is configured to accommodate the pins 30 of the clamping device 30 of FIGS. 1 and 2.

The first through third portions 343, 344, 345 of the surface 342 of the lateral pin opening 338(2) combine to have a first thickness t1 and the fourth portion 346 has a second thickness t2, and the first thickness t1 is greater than the second thickness 2.

Figure 17:
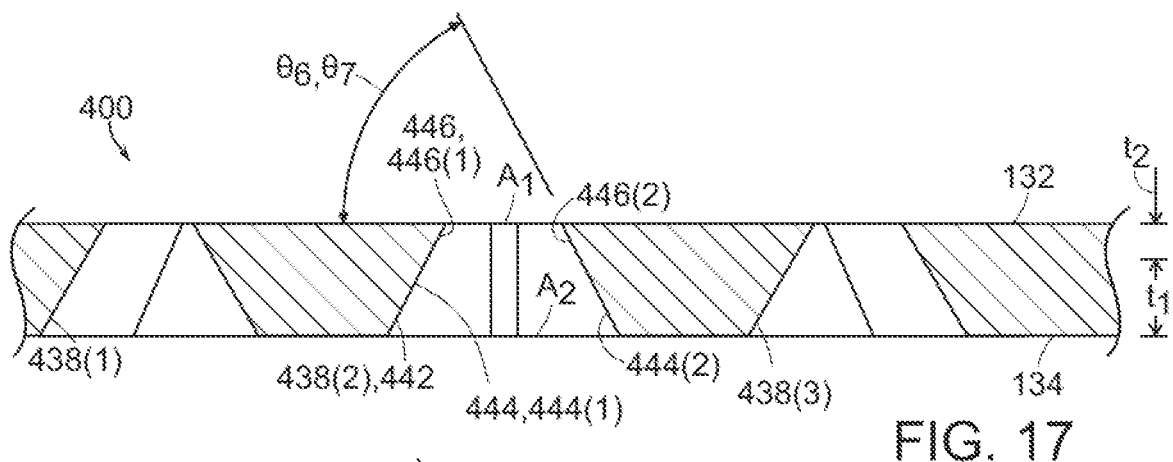

Referring to FIG. 17, another alternative embodiment accessory 400 may include alternative embodiment lateral pin openings 438. The accessory 400 is similar to the accessory 100 described above, and common reference numbers are used to refer to common elements. As seen when the accessory 400 is viewed in a cross section that is perpendicular to the first and second clamping faces 132, 134 and passes through at least one lateral pin opening, for example the second pin opening 438(2), each of the lateral pin openings 438 has a profile shape that is non-rectangular. In particular, each lateral pin opening 438 has a first area A1 in a location that is coplanar with the first clamping face 132 and a second area A2 in a location that is coplanar with the second clamping face 134, and the first area A1 is less than the second area A2.

In this embodiment, with reference to the cross-sectional view of the lateral pin opening 438(2), the surface 442 of the lateral pin opening 438(2) has a first portion 444 that adjoins the second clamping face 134 and a second portion 446 that extends between the first portion 444 and the first clamping face 132. The first portion 444 includes opposed surfaces 444(1), 444(2). Each of the opposed surfaces 444(1), 444(2) of the first portion 444 is linear and is at an acute sixth angle θ6 with respect to the first clamping face 132. The second portion 446 includes opposed surfaces 446(1), 446(2). Each of the opposed surfaces 446(1), 442(2) of the second portion 446 is linear and is at an acute seventh angle θ7 with respect to the first clamping face 132. Thus, the first and second portions 444, 446 are each at an angle relative to the first clamping face 132, and the sixth angle θ6 the same as the seventh angle θ7. In the illustrated embodiment, the sixth and seventh angles are in a range of 25 degrees to 65 degrees, for example 45 degrees or substantially 45 degrees.

The first portion 444 of the surface 442 of the lateral pin opening 438(2) has a first thickness t1 and the second portion 446 has a second thickness t2, where the term "thickness" refers to a dimension in a direction perpendicular to the first clamping surface 132, and the first thickness t1 is greater than the second thickness t2.

Figure 18:
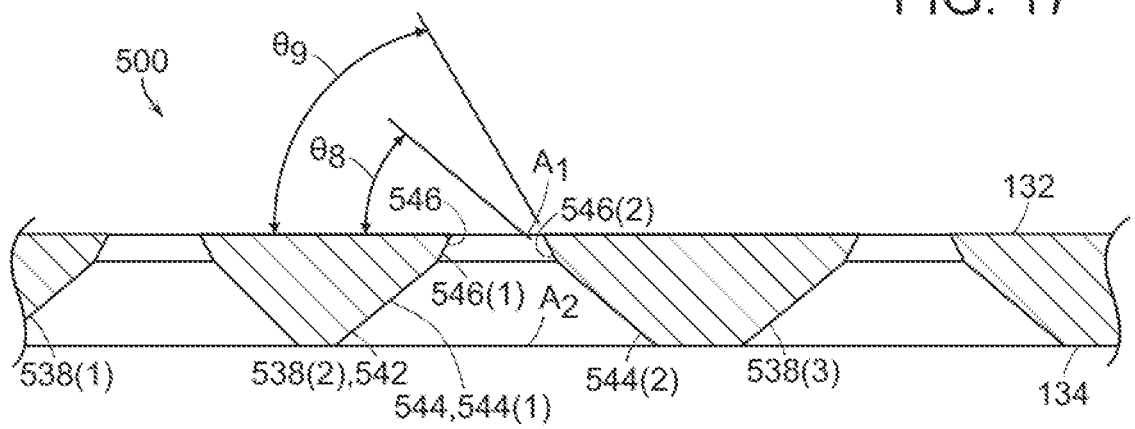

Referring to FIG. 18, another alternative embodiment accessory 500 may include alternative embodiment lateral pin openings 538. The accessory 500 is similar to the accessory 100 described above, and common reference numbers are used to refer to common elements. As seen when the accessory 500 is viewed in a cross section that is perpendicular to the first and second clamping faces 132, 134 and passes through at least one lateral pin opening, for example the second pin opening 538(2), each of the lateral pin openings 538 has a profile shape that is non-rectangular. In particular, each lateral pin opening 538 has a first area A1 in a location that is coplanar with the first clamping face 132 and a second area A2 in a location that is coplanar with the second clamping face 134, and the first area A1 is less than the second area A2.

In this embodiment, with reference to the cross-sectional view of the lateral pin opening 538(2), the surface 442 of the lateral pin opening 538(2) has a first portion 544 that adjoins the second clamping face 134 and a second portion 546 that extends between the first portion 544 and the first clamping face 132. The first portion 544 includes opposed surfaces 544(1), 544(2). Each of the opposed surfaces 544(1), 544(2) of the first portion 544 is linear and is at an acute eighth angle θ8 with respect to the first clamping face 132. The second portion 546 includes opposed surfaces 546(1), 546(2). Each of the opposed surfaces 546(1), 542(2) of the second portion 546 is linear and is at an acute ninth angle θ9 with respect to the first clamping face 132. Thus, the first and second portions 544, 546 are each at an acute angle relative to the first clamping face 132 and the eighth angle θ8 is different than the ninth angle θ9. In the illustrated embodiment, each of the eighth and ninth angles θ8, θ9 is in a range of 20 degrees to 60 degrees, for example 40 degrees.

The first portion 544 of the surface 542 of the lateral pin opening 538(2) has a first thickness t1 and the second portion 546 has a second thickness t2, where the term "thickness" refers to a dimension in a direction perpendicular to the first clamping surface 132, and the first thickness t1 is greater than the second thickness t2.

Figure 19:
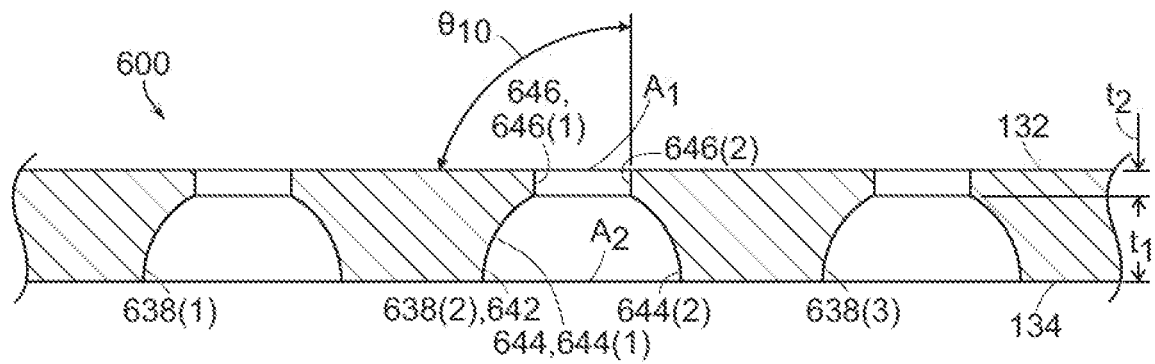

Referring to FIG. 19, another alternative embodiment accessory 600 may include alternative embodiment lateral pin openings 638. The accessory 600 is similar to the accessory 100 described above, and common reference numbers are used to refer to common elements. As seen when the accessory 600 is viewed in a cross section that is perpendicular to the first and second clamping faces 132, 134 and passes through at least one lateral pin opening, for example the second pin opening 638(2), each of the lateral pin openings 638 has a profile shape that is non-rectangular. In particular, each lateral pin opening 638 has a first area A1 in a location that is coplanar with the first clamping face 132 and a second area A2 in a location that is coplanar with the second clamping face 134, and the first area A1 is less than the second area A2.

In this embodiment, with reference to the cross-sectional view of the lateral pin opening 638(2), the surface 642 of the lateral pin opening 638(2) has a first portion 644 that adjoins the second clamping face 134 and a second portion 646 that extends between the first portion 644 and the first clamping face 132. The first portion 644 includes opposed surfaces 644(1), 644(2). Each of the opposed surfaces 644(1), 644(2) of the first portion 644 are curved so as to be concave with respect to the second clamping face 134. In the illustrated embodiment, the opposed surfaces 644(1). 644(2) comprise a single arc having a radius R, but may alternatively be formed of a combination of arcs of differing radii. The second portion 646 includes opposed surfaces 646(1), 646(2). Each of the opposed surfaces 646(1), 642(2) of the second portion 546 is linear and is at a right, or substantially right, tenth angle θ10 with respect to the first clamping face 132.

The first portion 644 of the surface 642 of the lateral pin opening 638(2) has a first thickness t1 and the second portion 646 has a second thickness t2, where the term "thickness" refers to a dimension in a direction perpendicular to the first clamping surface 132, and the first thickness t1 is greater than the second thickness t2.

Figure 20:
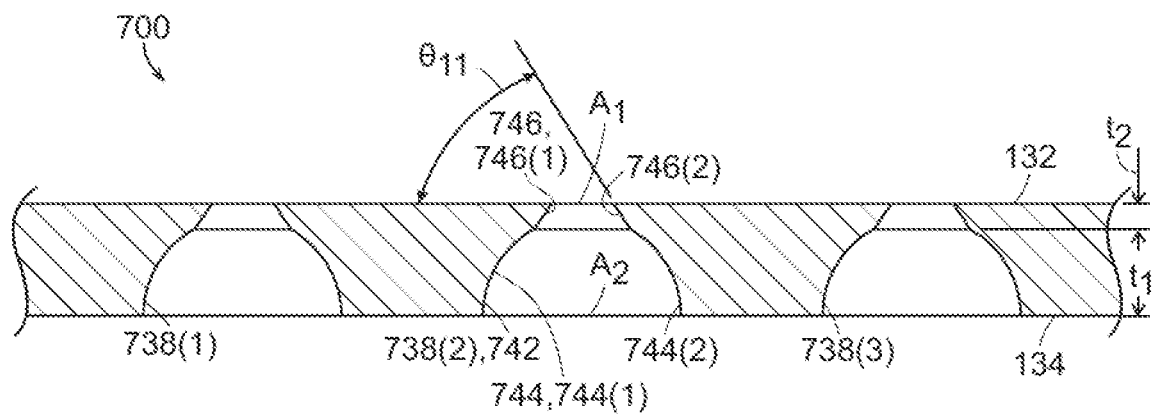

Referring to FIG. 20, another alternative embodiment accessory 700 may include alternative embodiment lateral pin openings 738. The accessory 700 is similar to the accessory 100 described above, and common reference numbers are used to refer to common elements. As seen when the accessory 700 is viewed in a cross section that is perpendicular to the first and second clamping faces 132, 134 and passes through at least one lateral pin opening, for example the second pin opening 738(2), each of the lateral pin openings 738 has a profile shape that is non-rectangular. In particular, each lateral pin opening 738 has a first area A1 in a location that is coplanar with the first clamping face 132 and a second area A2 in a location that is coplanar with the second clamping face 134, and the first area A1 is less than the second area A2.

In this embodiment, with reference to the cross-sectional view of the lateral pin opening 738(2), the surface 742 of the lateral pin opening 738(2) has a first portion 744 that adjoins the second clamping face 134 and a second portion 746 that extends between the first portion 744 and the first clamping face 132. The first portion 744 includes opposed surfaces 744(1), 744(2). Each of the opposed surfaces 744(1), 744(2) of the first portion 744 are curved so as to be concave with respect to the second clamping face 134. In the illustrated embodiment, the opposed surfaces 744(1), 744(2) comprise a single arc having a radius R, but may alternatively be formed of a combination of arcs of differing radii. The second portion 746 includes opposed surfaces 746(1), 746(2). Each of the opposed surfaces 746(1), 742(2) of the second portion 746 is linear and is at an acute eleventh angle θ11 with respect to the first clamping face 132. The eleventh angle θ11 is in a range of 25 degrees to 65 degrees, for example 45 degrees.

The first portion 744 of the surface 742 of the lateral pin opening 738(2) has a first thickness t1 and the second portion 746 has a second thickness t2, where the term "thickness" refers to a dimension in a direction perpendicular to the first clamping surface 132, and the first thickness t1 is greater than the second thickness t2.

Figure 21:
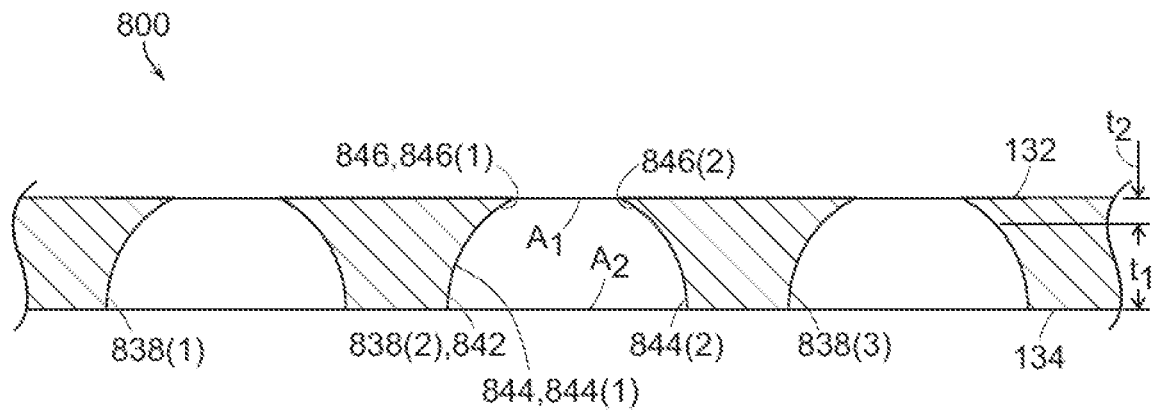

Referring to FIG. 21, another alternative embodiment accessory 800 may include alternative embodiment lateral pin openings 438. The accessory 400 is similar to the accessory 100 described above, and common reference numbers are used to refer to common elements. As seen when the accessory 400 is viewed in a cross section that is perpendicular to the first and second clamping faces 132, 134 and passes through at least one lateral pin opening, for example the second pin opening 438(2), each of the lateral pin openings 438 has a profile shape that is non-rectangular. In particular, each lateral pin opening 438 has a first area A1 in a location that is coplanar with the first clamping face 132 and a second area A2 in a location that is coplanar with the second clamping face 134, and the first area A1 is less than the second area A2.

In this embodiment, with reference to the cross-sectional view of the lateral pin opening 438(2), the surface 442 of the lateral pin opening 438(2) has a first portion 444 that adjoins the second clamping face 134 and a second portion 446 that extends between the first portion 444 and the first clamping face 132. The first portion 444 includes opposed surfaces 444(1), 444(2). Each of the opposed surfaces 444(1), 444(2) of the first portion 444 is linear and is at an acute sixth angle θ6 with respect to the first clamping face 132. The second portion 446 includes opposed surfaces 446(1), 446(2). Each of the opposed surfaces 446(1), 442(2) of the second portion 446 is linear and is at an acute seventh angle θ7 with respect to the first clamping face 132. Thus, the first and second portions 444, 446 are each at an angle relative to the first clamping face 132, and the sixth angle θ6 the same as the seventh angle θ7. In the illustrated embodiment, the sixth and seventh angles are in a range of 25 degrees to 65 degrees, for example 45 degrees or substantially 45 degrees.

The first portion 444 of the surface 442 of the lateral pin opening 438(2) has a first thickness t1 and the second portion 446 has a second thickness t2, where the term "thickness" refers to a dimension in a direction perpendicular to the first clamping surface 132, and the first thickness t1 is greater than the second thickness t2.

Figure 22:
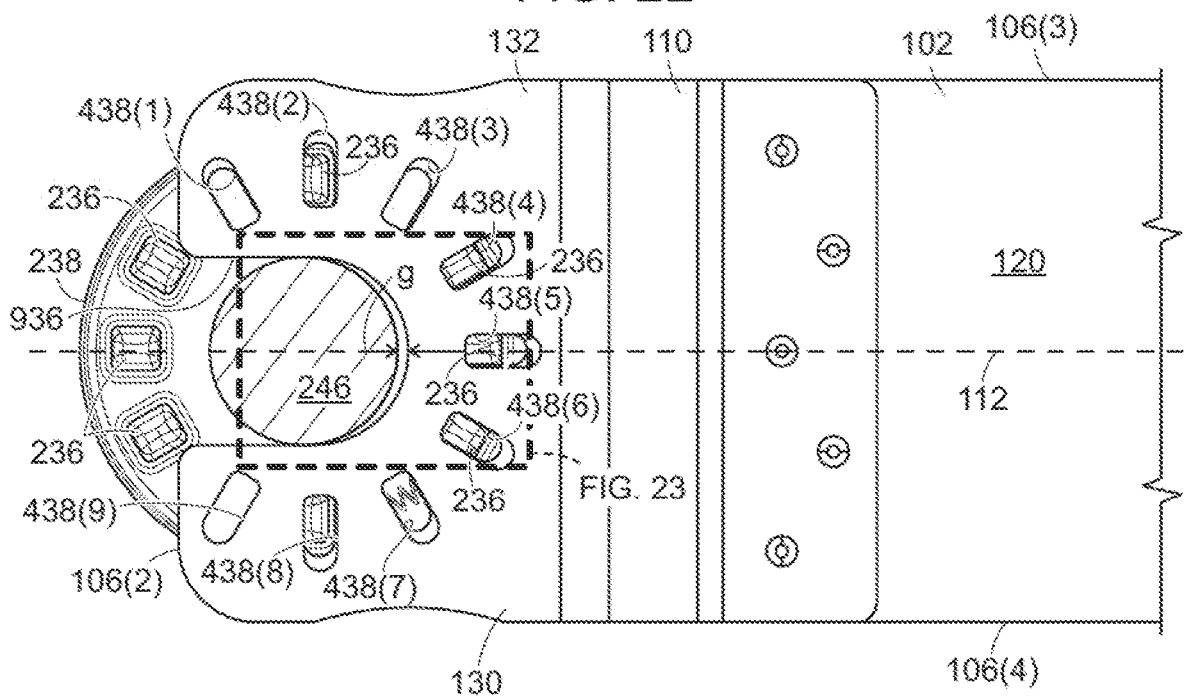
FIG. 22 is a top plan view of a portion of an alternative embodiment accessory illustrating a spindle slot in which the curved portion has a compound curve shape, the compound curve including an elliptical portion.
Figure 23:
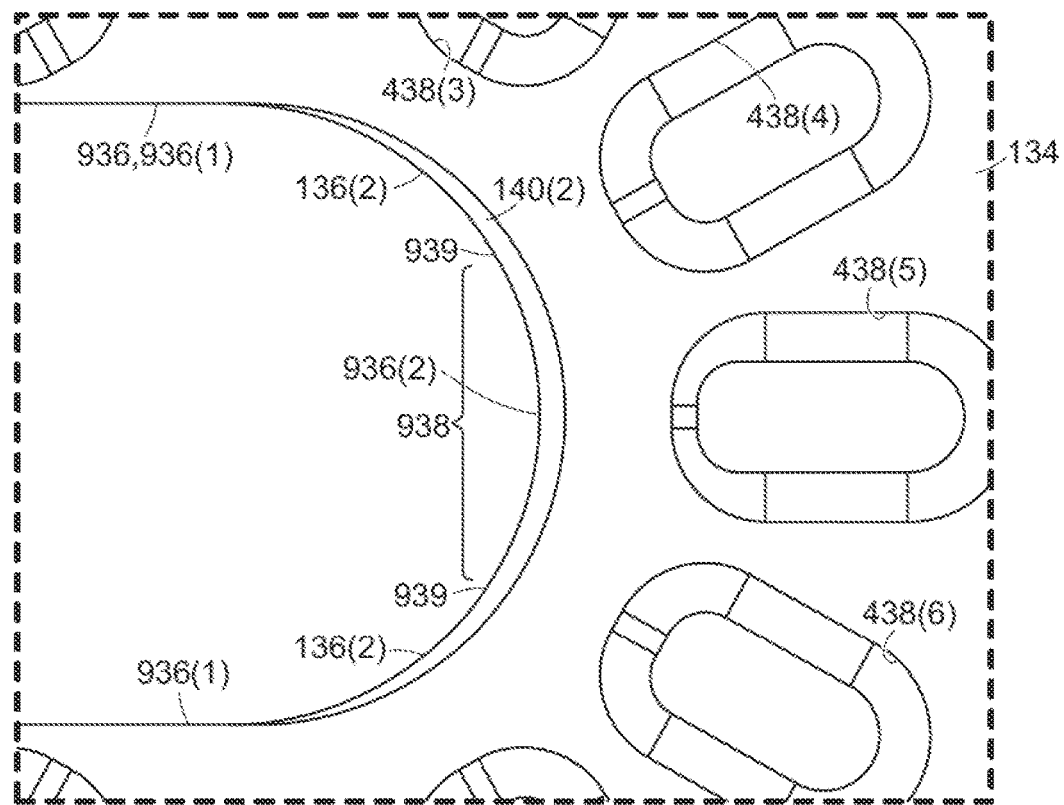
FIG. 23 is an enlargement of the region of FIG. 22 enclosed in broken lines illustrating the protrusions provided by the compound curve shape of the curved portion.

Referring to FIGS. 22-23, the accessory 100 is not limited to having a spindle slot 136 in which the curved portion 136(2) has a semi-circular profile when viewed in top plan view. For example, as seen in FIGS. 22-23, an alternative embodiment accessory 900 may include an alternative embodiment spindle slot 936. The accessory 900 is similar to the accessory 400 described above with respect to FIG. 17, and common reference numbers are used to refer to common elements. The accessory 900 includes a spindle slot 936 that is a concave cutout that intersects the accessory second end 106(2). When the accessory 900 is viewed in top plan view (FIG. 22), the spindle slot 936 is U shaped including linear portions 936(1) that are joined by a curved portion 936(2). The linear portions 936(1) are parallel to the accessory lateral sides 106(3), 106(4), and the curved portion 936(2) is a compound curve that opens facing the accessory second end 106(2). As used herein, the term "compound curve" refers to the curved portion 936(2) having a profile defined by a secondary curve portion 938 that is superimposed on the semicircular portion 136(2) along the accessory midline 112 (FIG. 23). As in the previous embodiment, the semicircular portion 136(2) has a diameter that is greater than the maximum diameter of the spindle 46. The secondary curve portion 938 may be elliptical in shape (shown) or may be semicircular and have a radius that is different than the radius of the semicircular portion 136(2). The secondary curved portion 938 is dimensioned such that when the secondary curve portion 938 is superimposed on the semicircular portion, a protrusion 939 is formed at each of the two intersections between the semicircular portion 136(2) and the secondary curve portion 938. As a result, when the accessory 900 is mounted in the clamping device 230, the spindle 246 abuts the protrusions 936 and a gap g exists between the surface of the spindle 246 and the secondary curve portion 938. Since the accessory 900 contacts the surface of the spindle 246 at two circumferentially spaced locations via the protrusions 939, the accessory 900 provides increased stability relative to some accessories that contact the spindle 246 at a single point.

The spindle slot 936 of the accessory 900 includes other features of the earlier described spindle slot 136. For example, in the linear portions 936(1), the surface of the spindle slot 936 is perpendicular to the first and second clamping faces 132, 134, while the curved portion 936(2) is beveled (only beveled portion 140(2) is shown in FIG. 22) with respect to both the first and second clamping faces 132, 134.

Figure 24:
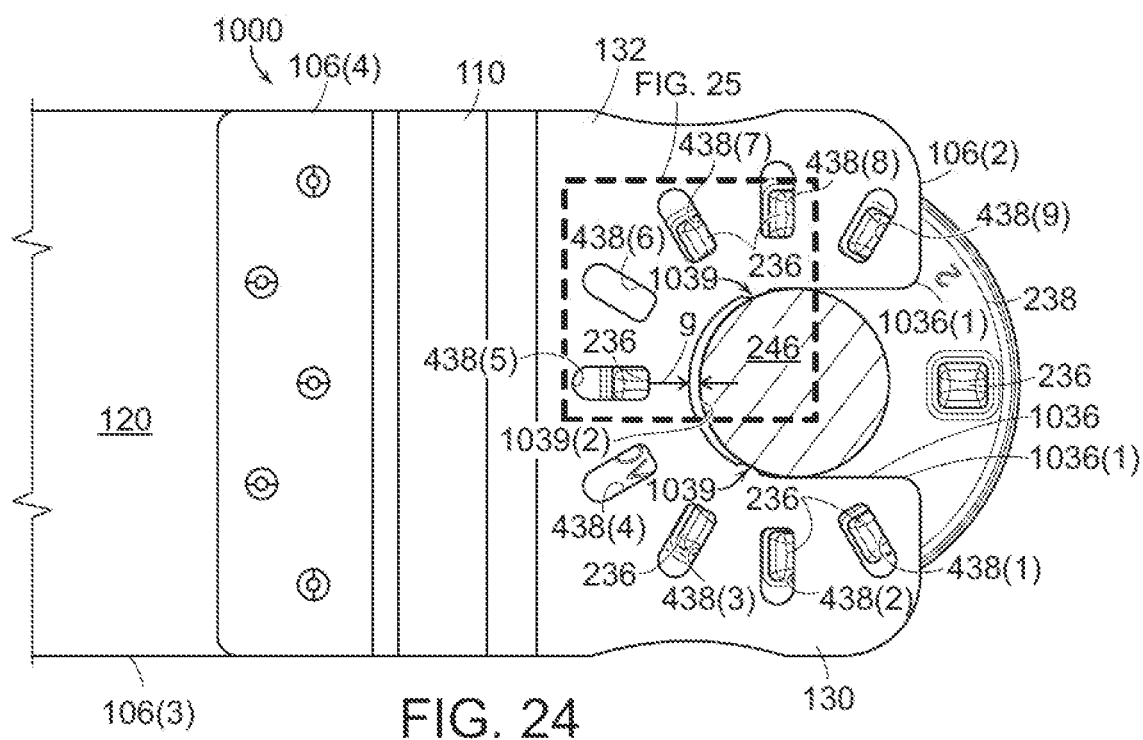
FIG. 24 is a top plan view of a portion of another alternative embodiment accessory illustrating a spindle slot in which the curved portion has a semi-circular shape and includes protrusions.
Figure 25:
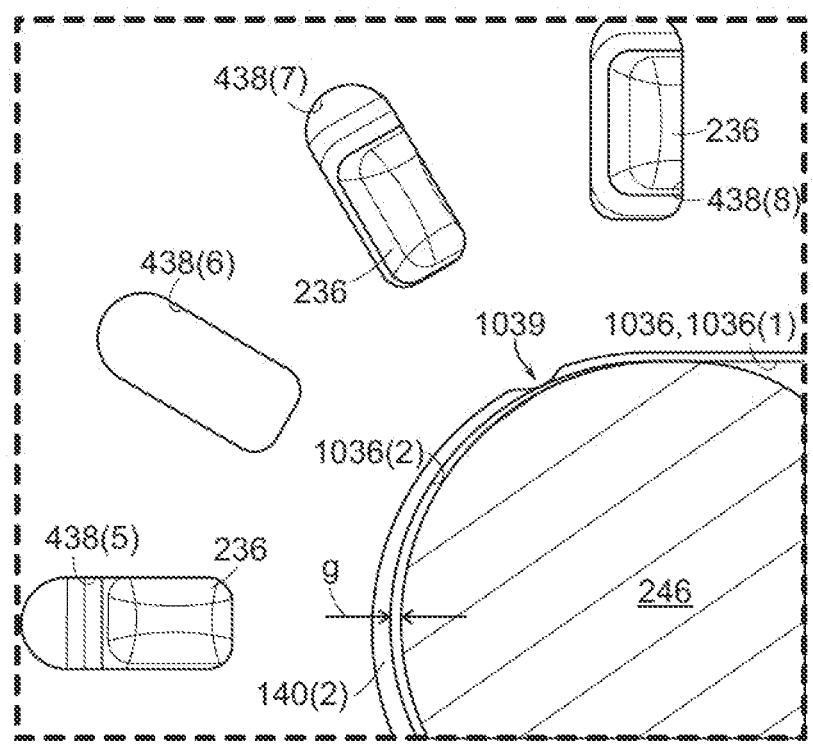
FIG. 25 is an enlargement of the region of FIG. 24 enclosed in broken lines.
Figure 32:
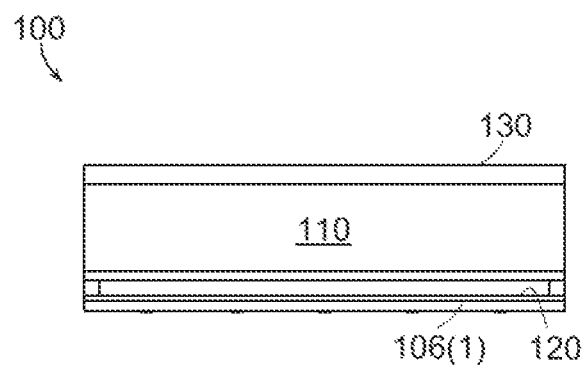
FIG. 32 is a front end view of the accessory of FIG. 3.
Figure 33:
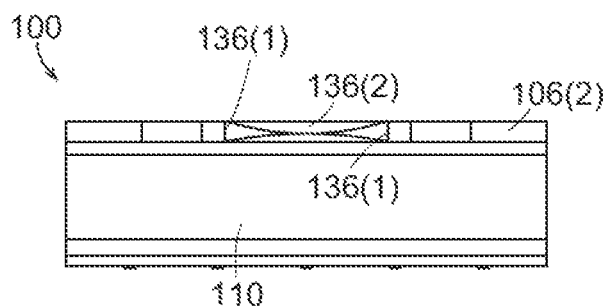
FIG. 33 is a rear end view of the accessory of FIG. 3.

Referring to FIGS. 24 and 25, the protrusions 939 along the spindle slot 936 can be provided using other strategies. For example, another alternative embodiment accessory 1000 may include another alternative embodiment spindle slot 1036. The accessory 1000 is similar to the accessory 400 described above with respect to FIG. 17, and common reference numbers are used to refer to common elements. The accessory 1000 includes a spindle slot 1036 that is a concave cutout that intersects the accessory second end 106(2). When the accessory 1000 is viewed in top plan view (FIG. 24), the spindle slot 1036 is U shaped including linear portions 1036(1) that are joined by a curved portion 1036(2). The linear portions 1036(1) are parallel to the accessory lateral sides 106(3), 106(4), and the curved portion 1036(2) is a semicircular curve that opens facing the accessory second end 106(2). As in the previous embodiments, the semicircular portion 1036(2) has a diameter that is greater than the maximum diameter of the spindle 46. The curved portion 1036(2) differs from the curved portion 136(2) described above in that the curved portion 1036(2) includes a pair of protrusions 1039 that are spaced apart along the circumference of the curved portion 1036(2). The protrusions 1039 are rounded as shown but are not limited to this configuration. Since the accessory 1000 includes the protrusions 1039, when the accessory 1000 is mounted in the clamping device 230, a gap g exists between the surface of the spindle 246 and the curved portion 1036(2). In addition, the accessory 1000 contacts the spindle at each of the two protrusions 1039. By contacting the surface of the spindle 246 at two locations via the protrusions 1039, the accessory 1000 provides increased stability relative to some accessories that contact the spindle 46, 246 at a single point.

The spindle slot 1036 of the accessory 1000 includes other features of the earlier described spindle slot 136. For example, in the linear portions 1036(1), the surface of the spindle slot 1036 is perpendicular to the first and second clamping faces 132, 134, while the curved portion 1036(2) is beveled (only beveled portion 140(2) is shown in FIG. 25) with respect to both the first and second clamping faces 132, 134.

In the illustrated embodiments, the accessory 100 is a cutting blade having a generally rectangular profile when the accessory is viewed in top plan view, including a first end 106(1) that is parallel to the second end 106(2) and parallel lateral sides 106(3), 106(4), where the lateral sides 106(3), 106(4) are perpendicular to the first and second ends 106(1), 106(2). The accessory 100 is not limited to this configuration. For example, in some embodiments, the lateral sides 106(3), 106(4) may be non-parallel such that when the accessory is viewed in top plan view, the accessory 100 may have a generally trapezoidal or generally triangular profile.

In other embodiments, the accessory 100 may have a curved or partial-circular or circular profile when viewed in top plan view.

In the illustrated embodiment, the accessory 100 includes a pair of closely spaced, parallel bends 108(1), 108(2) that are located closer to second end 106(2) than the first end 106(1). The accessory 100 is not limited to this configuration. For example, in some embodiments, the parallel bends 108(1), 108(2) may have a different location or omitted completely.

In the illustrated embodiment, the accessory 100 includes nine pin openings 138(1), 138(2), 138(3), 138(4), 138(5), 138(6), 138(7), 138(8), 138(9) distributed about the spindle slot 136. The accessory 100 is not limited to this configuration. For example, in some embodiments, the accessory 100 may include a greater or fewer number of pin openings.

In the illustrated embodiment, the accessory 100 includes eight lateral pin openings 138(1), 138(2), 138(3), 138(4), 138(6), 138(7), 138(8), 138(9) in which at least a portion of opposed surfaces of each lateral pin opening is non-parallel, and also includes a central pin opening 138(5) in which opposed surfaces of the pin opening are parallel. The accessory 100 is not limited to this configuration. For example, in some embodiments, the accessory 100 may include a greater or fewer number of pin openings in which opposed surfaces of the pin opening are parallel or non-parallel.

In the illustrated embodiments, the lateral pin openings 138(1), 138(2), 138(3), 138(4), 138(6), 138(7), 138(8), 138(9), when viewed in cross-section, have opposed surfaces which are symmetric about the pin longitudinal axis 139. However, the lateral pin openings 138(1), 138(2), 138(3), 138(4), 138(6), 138(7), 138(8), 138(9) are not limited to being symmetric about the pin longitudinal axis. In some embodiments, the lateral pin openings 138(1). 138(2). 138(3), 138(4), 138(6). 138(7), 138(8), 138(9) may be asymmetric about the pin longitudinal axis 139.

Although the accessory 100 is illustrated as a cutting tool, specifically a cutting blade, the accessory is not limited to this embodiment. For example, in other embodiments the accessory may be configured to effect sanding, scraping, cutting, grinding, scoring and/or other operations on a workpiece. To this end, the working portion 120 may have a different shape and/or the cutting edge 122 may be replaced with a different cutting edge, a different cutting surface or an abrasive edge or surface, as required by the specific application.

The working portion of the accessory includes a working edge that is applied against the workpiece to effect the desired change. In a cutting accessory (e.g., a cutting blade), the working edge defines a series of cutting teeth. In a sanding accessory (e.g., a sanding block), the working edge is an abrasive surface.

Selective illustrative embodiments of the tool and the accessory are described above in some detail. It should be understood that only structures considered necessary for clarifying the tool and the accessory have been described herein. Other conventional structures, and those of ancillary and auxiliary components of the tool and the accessory, are assumed to be known and understood by those skilled in the art. Moreover, while working examples of the tool and the accessory have been described above, the tool and the accessory are not limited to the working examples described above, but various design alterations may be carried out without departing from the tool and the accessory as set forth in the claims.

What is claimed is:

1. An accessory for an oscillating power tool, the accessory comprising:
a working portion configured to perform an operation on a workpiece; and
a mounting portion configured to be clamped between a clamping flange and a spindle head of a tool holder of the oscillating power tool, the mounting portion including
a first clamping face that is configured to abut the clamping flange, and
a second clamping face that is spaced apart from the first clamping face and faces away from the first clamping face, the second clamping face being configured to abut the spindle head,
a spindle slot that extends in an axial direction through the mounting portion from the first clamping face to the second clamping face, the spindle slot configured to accommodate a spindle of the oscillating power tool, and
pin openings that extend in the axial direction through the mounting portion from the first clamping face to the second clamping face, the pin openings being arranged around the spindle slot so as to be spaced apart from the spindle slot, the pin openings forming a closed section when the mounting portion is viewed in a direction parallel to the axial direction and is configured to receive pins which are arranged around the spindle of the oscillating power tool,
wherein
when viewed in a cross section that is perpendicular to the first clamping face, at least a portion of opposed surfaces of at least one pin opening are non-parallel.

2. The accessory of claim 1, wherein the portion of opposed surfaces of at least one pin opening adjoins the second clamping face.

3. The accessory of claim 1, wherein the portion of opposed surfaces of at least one pin opening is linear and at an acute angle with respect to the first clamping face.

4. The accessory of claim 1, wherein the portion of opposed surfaces of at least one pin opening is non-linear.

5. The accessory of claim 1, wherein the portion of opposed surfaces of at least one pin opening is curved.

6. The accessory of claim 1, wherein
the portion of opposed surfaces of at least one pin opening corresponds to a first portion of opposed surfaces of at least one pin opening,
when viewed in a cross section that is perpendicular to the first clamping face, a second portion of opposed surfaces of at least one pin opening adjoins the first clamping face,
the first portion of opposed surfaces of at least one pin opening is linear and at a first angle with respect to the first clamping face,
the second portion of opposed surfaces of at least one pin opening is linear and at a second angle with respect to the first clamping face, and
the first angle is different from the second angle.

7. The accessory of claim 6, wherein the first angle is an acute angle and the second angle is substantially a right angle.

8. The accessory of claim 1, wherein
the portion of opposed surfaces of at least one pin opening corresponds to a first portion of opposed surfaces of at least one pin opening,
when viewed in a cross section that is perpendicular to the first clamping face, a second portion of opposed surfaces of at least one pin opening adjoins the first clamping face,
the first portion of opposed surfaces of at least one pin opening is curved and defines a concavity with respect to the second clamping face, and
the second portion of opposed surfaces of at least one pin opening is linear and at an angle with respect to the first clamping face.

9. The accessory of claim 1, wherein
the portion of opposed surfaces of at least one pin opening corresponds to a first portion of opposed surfaces of at least one pin opening,
when viewed in a cross section that is perpendicular to the first clamping face, a second portion of opposed surfaces of at least one pin opening adjoins the first clamping face,
the first portion of opposed surfaces of at least one pin opening has a first thickness,
the second portion of opposed surfaces of at least one pin opening has a second thickness,
thickness is a term that refers to a dimension in a direction perpendicular to the first clamping face, and
the first thickness is greater than the second thickness.

10. The accessory of claim 1, wherein the portion of opposed surfaces of at least one pin opening extends from the first clamping face to the second clamping face.

11. The accessory of claim 1, wherein
the at least one pin opening is elongated and defines a long axis in a direction corresponding to a direction of elongation,
the spindle of the oscillating power tool has a spindle longitudinal axis that extends axially and is centered in the spindle slot, and
the long axis of the at least one pin opening extends along a radius of the spindle longitudinal axis.

12. The accessory of claim 1, wherein at least one pin opening has a first area in a location that is coplanar with the first clamping face and a second area in a location that is coplanar with the second clamping face, and the first area is less than the second area.

13. An accessory for an oscillating power tool, the accessory comprising:
a working portion configured to perform an operation on a workpiece; and
a mounting portion configured to be clamped between a clamping flange and a spindle head of a tool holder of the oscillating power tool, the mounting portion including
a first clamping face that is configured to abut the clamping flange, and
a second clamping face that is spaced apart from the first clamping face and faces away from the first clamping face, the second clamping face being configured to abut the spindle head,
a spindle slot that extends in an axial direction through the mounting portion from the first clamping face to the second clamping face, the spindle slot configured to accommodate a spindle of the oscillating power tool, and
pin openings that extend in the axial direction through the mounting portion from the first clamping face to the second clamping face, the pin openings being arranged around the spindle slot so as to be spaced apart from the spindle slot, the pin openings configured to receive pins which are arranged around the spindle of the oscillating power tool,
wherein
at least one pin opening has a first area in a location that is coplanar with the first clamping face and a second area in a location that is coplanar with the second clamping face, and
the first area is less than the second area.

14. The accessory of claim 13, wherein
when viewed in a cross section that is perpendicular to the first clamping face, at least a portion of opposed surfaces of at least one pin opening are non-parallel.

15. The accessory of claim 14, wherein the portion of opposed surfaces of at least one pin opening adjoins the second clamping face, is linear and at an acute angle with respect to the first clamping face.

16. The accessory of claim 14, wherein the portion of opposed surfaces of at least one pin opening adjoins the second clamping face and is non-linear.

17. The accessory of claim 14, wherein
the portion of opposed surfaces of at least one pin opening corresponds to a first portion of opposed surfaces of at least one pin opening,
when viewed in a cross section that is perpendicular to the first clamping face, a second portion of opposed surfaces of at least one pin opening adjoins the first clamping face,
the first portion of opposed surfaces of at least one pin opening is linear and at a first angle with respect to the first clamping face,
the second portion of opposed surfaces of at least one pin opening is linear and at a second angle with respect to the first clamping face, and
the first angle is different from the second angle.

18. The accessory of claim 17, wherein the first angle is an acute angle and the second angle is substantially a right angle.

* * * * *